US010509372B2

(12) United States Patent
Chandler

(10) Patent No.: US 10,509,372 B2
(45) Date of Patent: *Dec. 17, 2019

(54) AUTOMATED TUNING OF MULTIPLE FUEL GAS TURBINE COMBUSTION SYSTEMS

(71) Applicant: Gas Turbine Efficiency Sweden AB, Jarfalla (SE)

(72) Inventor: Christopher Chandler, Austin, TX (US)

(73) Assignee: Gas Turbine Efficiency Sweden AB, Jarfalla (SE)

( * ) Notice: Subject to any disclaimer, the term of this patent is extended or adjusted under 35 U.S.C. 154(b) by 235 days.

This patent is subject to a terminal disclaimer.

(21) Appl. No.: 14/982,691

(22) Filed: Dec. 29, 2015

(65) Prior Publication Data

US 2016/0108820 A1 Apr. 21, 2016

Related U.S. Application Data

(63) Continuation of application No. 13/767,920, filed on Feb. 15, 2013, now Pat. No. 9,354,618, which is a (Continued)

(51) Int. Cl.
*F02C 9/28* (2006.01)
*G05B 13/00* (2006.01)
(Continued)

(52) U.S. Cl.
CPC .............. *G05B 13/00* (2013.01); *F02C 9/28* (2013.01); *F02C 9/40* (2013.01); *F23N 1/002* (2013.01);
(Continued)

(58) Field of Classification Search
CPC ....................................................... F02C 9/28
See application file for complete search history.

(56) References Cited

U.S. PATENT DOCUMENTS 3,842,597 A 10/1974 Ehrich
3,866,109 A 2/1975 Reed et al.
(Continued)

FOREIGN PATENT DOCUMENTS

CN 1148152 4/1997
CN 1611839 5/2005
(Continued)

OTHER PUBLICATIONS

Examination Report dated Oct. 31, 2016, directed to corresponding Gulf Cooperation Council Application No. GC 2013-23625; 6 pages.
(Continued)

*Primary Examiner* — Tejal Gami
(74) *Attorney, Agent, or Firm* — DLA Piper LLP US

(57) ABSTRACT

Provided herein is a method for automated control of the gas turbine fuel composition through automated modification of the ratio of fuel gas from multiple sources. The method includes providing first and second fuel sources. The method further includes sensing the operational parameters of a turbine and determining whether the operational parameters are within preset operational limits. The method also adjusting the ration of the first fuel source to the second fuel source, based on whether the operational parameters are within the preset operational limits.

35 Claims, 21 Drawing Sheets

Related U.S. Application Data continuation-in-part of application No. 13/542,222, filed on Jul. 5, 2012, now Pat. No. 9,267,443, which is a continuation-in-part of application No. 12/463,060, filed on May 8, 2009, now Pat. No. 8,437,941.

(51) Int. Cl.

| | | |
|---|---|---|
| *F23N 1/00* | (2006.01) | |
| *F23N 5/00* | (2006.01) | |
| *F23N 5/24* | (2006.01) | |
| *F23R 3/34* | (2006.01) | |
| *F23R 3/36* | (2006.01) | |
| *F02C 9/40* | (2006.01) | |
| *G05B 19/05* | (2006.01) | |

(52) U.S. Cl.
CPC ............ *F23N 5/003* (2013.01); *F23N 5/242* (2013.01); *F23R 3/34* (2013.01); *F23R 3/36* (2013.01); *G05B 19/05* (2013.01); *F05D 2260/80* (2013.01); *F05D 2270/082* (2013.01); *F05D 2270/083* (2013.01); *F05D 2270/303* (2013.01); *F05D 2270/31* (2013.01); *F23K 2301/204* (2013.01); *F23K 2301/206* (2013.01); *F23N 2037/08* (2013.01); *F23N 2041/20* (2013.01); *F23R 2900/00013* (2013.01); *G05B 2219/1204* (2013.01)

(56) References Cited

U.S. PATENT DOCUMENTS

| | | |
|---|---|---|
| 3,875,380 A | 4/1975 | Rankin |
| 3,898,439 A | 8/1975 | Reed et al. |
| 3,919,623 A | 11/1975 | Reuther |
| 3,924,140 A | 12/1975 | Yannone |
| 4,010,605 A | 3/1977 | Uram |
| 4,027,145 A | 5/1977 | McDonald et al. |
| 4,028,884 A | 6/1977 | Martz et al. |
| 4,031,404 A | 6/1977 | Martz et al. |
| 4,039,804 A | 8/1977 | Reed et al. |
| 4,039,846 A | 8/1977 | Vance |
| 4,051,669 A | 10/1977 | Yannone et al. |
| 4,115,998 A | 9/1978 | Gilbert et al. |
| 4,195,231 A | 3/1980 | Reed et al. |
| 4,201,923 A | 5/1980 | Reed et al. |
| 4,208,591 A | 6/1980 | Yannone et al. |
| 4,278,064 A | 7/1981 | Regueiro |
| 4,280,060 A | 7/1981 | Kure-Jensen et al. |
| 4,283,634 A | 8/1981 | Yannone et al. |
| 4,305,129 A | 12/1981 | Yannone et al. |
| 4,308,463 A | 12/1981 | Giras et al. |
| 4,314,441 A | 2/1982 | Yannone et al. |
| 4,319,320 A | 3/1982 | Sato et al. |
| 4,333,310 A | 6/1982 | Uram |
| 4,414,540 A | 11/1983 | Dickenson |
| 4,423,594 A | 1/1984 | Ellis |
| 4,445,180 A | 4/1984 | Davis et al. |
| 4,455,614 A | 6/1984 | Martz et al. |
| 4,716,858 A | 1/1988 | Bartels |
| 4,735,052 A | 4/1988 | Maeda et al. |
| 4,761,948 A | 8/1988 | Sood et al. |
| 4,811,555 A | 3/1989 | Bell |
| 4,845,940 A | 7/1989 | Beer |
| 4,893,467 A | 1/1990 | Woodson |
| 4,930,305 A | 6/1990 | Bell |
| 4,936,088 A | 6/1990 | Bell |
| 5,022,849 A | 6/1991 | Yoshii et al. |
| 5,024,055 A | 6/1991 | Kirikami et al. |
| 5,048,285 A | 9/1991 | Schmitt et al. |
| 5,237,939 A | 8/1993 | Spokoyny et al. |
| 5,307,619 A | 5/1994 | McCarty et al. |
| 5,319,931 A | 6/1994 | Beebe et al. |
| 5,319,936 A | 6/1994 | Ikeda et al. |
| 5,339,635 A | 8/1994 | Iwai et al. |
| 5,349,812 A | 9/1994 | Taniguchi et al. |
| 5,365,732 A | 11/1994 | Correa |
| 5,367,470 A | 11/1994 | Lang |
| 5,423,175 A | 6/1995 | Beebe et al. |
| 5,450,724 A | 9/1995 | Kesseli et al. |
| 5,480,298 A | 1/1996 | Brown |
| 5,487,265 A | 1/1996 | Rajamani et al. |
| 5,490,377 A | 2/1996 | Janes |
| 5,491,970 A | 2/1996 | Davis, Jr. et al. |
| 5,517,424 A | 5/1996 | Marcelle et al. |
| 5,533,329 A | 7/1996 | Ohyama et al. |
| 5,551,228 A | 9/1996 | Mick et al. |
| 5,564,270 A | 10/1996 | Kesseli et al. |
| 5,609,655 A | 3/1997 | Kesseli et al. |
| 5,636,507 A | 6/1997 | Rajamani et al. |
| 5,661,969 A | 9/1997 | Beebe et al. |
| 5,706,643 A | 1/1998 | Snyder et al. |
| 5,719,791 A | 2/1998 | Neumeier et al. |
| 5,722,230 A | 3/1998 | Cohen et al. |
| 5,729,968 A | 3/1998 | Cohen et al. |
| 5,784,300 A | 7/1998 | Neumeier et al. |
| 5,790,420 A | 8/1998 | Lang |
| 5,791,889 A | 8/1998 | Gemmen et al. |
| 5,794,446 A | 8/1998 | Earley et al. |
| 5,826,429 A | 10/1998 | Beebe et al. |
| 5,845,230 A | 12/1998 | Lamberson |
| 5,847,353 A | 12/1998 | Titus et al. |
| 5,867,977 A | 2/1999 | Zachary et al. |
| 5,878,566 A | 3/1999 | Endo et al. |
| 5,896,736 A | 4/1999 | Rajamani |
| 5,924,275 A | 7/1999 | Cohen et al. |
| 5,930,990 A | 8/1999 | Zachary et al. |
| 5,943,866 A | 8/1999 | Lovett et al. |
| 6,055,808 A | 5/2000 | Poola et al. |
| 6,066,825 A | 5/2000 | Titus et al. |
| 6,071,114 A | 6/2000 | Cusack et al. |
| 6,082,092 A | 7/2000 | Vandervort |
| 6,092,362 A | 7/2000 | Nagafuchi et al. |
| 6,125,625 A | 10/2000 | Lipinski et al. |
| 6,138,081 A | 10/2000 | Olejack et al. |
| 6,145,297 A | 11/2000 | Nagafuchi et al. |
| 6,164,055 A | 12/2000 | Lovett et al. |
| 6,195,607 B1 | 2/2001 | Rajamani et al. |
| 6,196,000 B1 | 3/2001 | Fassbender |
| 6,202,401 B1 | 3/2001 | Seume et al. |
| 6,205,765 B1 | 3/2001 | Iasillo et al. |
| 6,250,063 B1 | 6/2001 | Davis, Jr. et al. |
| 6,269,299 B1 | 7/2001 | Blotenberg |
| 6,287,111 B1 | 9/2001 | Gensler |
| 6,293,105 B1 | 9/2001 | Claesson et al. |
| 6,298,718 B1 | 10/2001 | Wang |
| 6,324,827 B1 | 12/2001 | Basu et al. |
| 6,338,240 B1 | 1/2002 | Endo et al. |
| 6,341,519 B1 | 1/2002 | Khesin et al. |
| 6,343,251 B1 | 1/2002 | Herron et al. |
| 6,354,071 B2 | 3/2002 | Tegel et al. |
| 6,363,330 B1 | 3/2002 | Alag et al. |
| 6,389,330 B1 | 5/2002 | Khesin |
| 6,397,602 B2 | 6/2002 | Vandervort et al. |
| 6,405,523 B1 | 6/2002 | Foust et al. |
| 6,408,611 B1 | 6/2002 | Keller et al. |
| 6,412,271 B1 | 7/2002 | Maker et al. |
| 6,418,726 B1 | 7/2002 | Foust et al. |
| 6,460,339 B2 | 10/2002 | Nishida et al. |
| 6,460,341 B1 | 10/2002 | Gutmark et al. |
| 6,461,144 B1 | 10/2002 | Gutmark et al. |
| 6,464,489 B1 | 10/2002 | Gutmark et al. |
| 6,466,859 B1 | 10/2002 | Fujime |
| 6,480,810 B1 | 11/2002 | Cardella et al. |
| 6,484,489 B1 | 11/2002 | Foust et al. |
| 6,522,991 B2 | 2/2003 | Banaszuk et al. |
| 6,522,994 B1 | 2/2003 | Lang |
| 6,529,849 B2 | 3/2003 | Umezawa et al. |
| 6,556,956 B1 | 4/2003 | Hunt |
| 6,560,563 B1 | 5/2003 | Lang |
| 6,568,166 B2 | 5/2003 | Jay et al. |
| 6,584,429 B1 | 6/2003 | Lang |
| 6,598,383 B1 | 7/2003 | Vandervort et al. |
| 6,612,112 B2 | 9/2003 | Gilbreth et al. |

(56) References Cited

U.S. PATENT DOCUMENTS

| | | |
|---|---|---|
| 6,616,901 B1 | 9/2003 | Lagana et al. |
| 6,640,544 B2 | 11/2003 | Suenaga et al. |
| 6,651,035 B1 | 11/2003 | Lang |
| 6,657,332 B2 | 12/2003 | Balas |
| 6,672,071 B2 | 1/2004 | Woltmann |
| 6,691,054 B1 | 2/2004 | Lang |
| 6,694,900 B2 | 2/2004 | Lissianski et al. |
| 6,704,620 B1 | 3/2004 | Kutzner et al. |
| 6,714,877 B1 | 3/2004 | Lang |
| 6,721,631 B2 | 4/2004 | Shimizu et al. |
| 6,721,649 B2 | 4/2004 | Knott et al. |
| 6,722,135 B2 | 4/2004 | Davis, Jr. et al. |
| 6,725,665 B2 | 4/2004 | Tuschy et al. |
| 6,742,341 B2 | 6/2004 | Ryan et al. |
| 6,745,152 B1 | 6/2004 | Lang |
| 6,757,619 B2 | 6/2004 | Zison et al. |
| 6,760,659 B1 | 7/2004 | Cowen |
| 6,760,689 B2 | 7/2004 | Follin et al. |
| 6,766,224 B2 | 7/2004 | Tanaka |
| 6,772,583 B2 | 8/2004 | Bland |
| 6,789,000 B1 | 9/2004 | Munson, Jr. |
| 6,799,146 B1 | 9/2004 | Lang |
| 6,810,358 B1 | 10/2004 | Lang et al. |
| 6,810,655 B2 | 11/2004 | Davis, Jr. et al. |
| 6,823,675 B2 | 11/2004 | Brunell et al. |
| 6,834,226 B2 | 12/2004 | Hartzheim |
| 6,839,613 B2 | 1/2005 | McCarthy et al. |
| 6,840,046 B2 | 1/2005 | Paschereit et al. |
| 6,845,300 B2 | 1/2005 | Haghgooie et al. |
| 6,862,889 B2 | 3/2005 | Held et al. |
| 6,865,889 B2 | 3/2005 | Mancini et al. |
| 6,868,368 B1 | 3/2005 | Lang |
| 6,871,501 B2 | 3/2005 | Bibler et al. |
| 6,873,933 B1 | 3/2005 | Lang |
| 6,877,307 B2 | 4/2005 | Ryan et al. |
| 6,880,325 B2 | 4/2005 | Aoyama |
| 6,883,301 B2 | 4/2005 | Woltmann |
| 6,898,488 B2 | 5/2005 | Kusaka et al. |
| 6,910,335 B2 | 6/2005 | Viteri et al. |
| 6,912,855 B2 | 7/2005 | Bescherer et al. |
| 6,912,856 B2 | 7/2005 | Morgan et al. |
| 6,912,889 B2 | 7/2005 | Staphanos et al. |
| 6,918,253 B2 | 7/2005 | Fassbender |
| 6,920,761 B2 | 7/2005 | Laper |
| 6,931,853 B2 | 8/2005 | Dawson |
| 6,941,217 B1 | 9/2005 | Munson, Jr. |
| 6,952,639 B2 | 10/2005 | Kumar et al. |
| 6,952,642 B1 | 10/2005 | Cowen |
| 6,955,039 B2 | 10/2005 | Nomura et al. |
| 6,965,826 B2 | 11/2005 | Andres et al. |
| 6,968,693 B2 | 11/2005 | Colibaba-Evulet et al. |
| 6,973,376 B2 | 12/2005 | Kusaka et al. |
| 6,973,790 B2 | 12/2005 | Suenaga et al. |
| 6,973,791 B2 | 12/2005 | Handelsman et al. |
| 6,976,351 B2 | 12/2005 | Catharine et al. |
| 6,986,254 B2 | 1/2006 | Stuttaford et al. |
| 6,989,693 B2 | 1/2006 | Kuo et al. |
| 6,990,432 B1 | 1/2006 | McCarthy et al. |
| 6,996,991 B2 | 2/2006 | Gadde et al. |
| 7,006,898 B2 | 2/2006 | Barbir et al. |
| 7,007,487 B2 | 3/2006 | Belokon et al. |
| 7,039,555 B2 | 5/2006 | Lang |
| 7,047,747 B2 | 5/2006 | Tanaka |
| 7,050,943 B2 | 5/2006 | Kauffman et al. |
| 7,059,135 B2 | 6/2006 | Held et al. |
| 7,062,389 B2 | 6/2006 | Johnson et al. |
| 7,065,471 B2 | 6/2006 | Gotoh et al. |
| 7,065,472 B2 | 6/2006 | Hayashi et al. |
| 7,089,746 B2 | 8/2006 | Lieuwen et al. |
| 7,100,357 B2 | 9/2006 | Morgan et al. |
| 7,107,773 B2 | 9/2006 | Little |
| 7,111,463 B2 | 9/2006 | Sprouse et al. |
| 7,127,329 B2 | 10/2006 | Kusaka et al. |
| 7,127,898 B2 | 10/2006 | Healy |
| 7,143,572 B2 | 12/2006 | Ooka et al. |
| 7,161,678 B2 | 1/2007 | Schultz |
| 7,162,875 B2 | 1/2007 | Fletcher et al. |
| 7,177,728 B2 | 2/2007 | Gardner |
| 7,181,320 B2 | 2/2007 | Whiffen et al. |
| 7,181,321 B2 | 2/2007 | Schlicker et al. |
| 7,181,916 B2 | 2/2007 | Ziminsky et al. |
| 7,185,494 B2 | 3/2007 | Ziminsky et al. |
| 7,188,019 B2 | 3/2007 | Nomura et al. |
| 7,188,465 B2 | 3/2007 | Kothnur et al. |
| 7,190,149 B2 | 3/2007 | Huff et al. |
| 7,204,133 B2 | 4/2007 | Benson et al. |
| 7,210,297 B2 | 5/2007 | Shah et al. |
| 7,216,486 B2 | 5/2007 | Doebbeling et al. |
| 7,219,040 B2 | 5/2007 | Renou et al. |
| 7,234,305 B2 | 6/2007 | Nomura et al. |
| 7,237,385 B2 | 7/2007 | Carrea |
| 7,246,002 B2 | 7/2007 | Healy et al. |
| 7,246,024 B2 | 7/2007 | Muramatsu et al. |
| 7,249,462 B2 | 7/2007 | Aumont et al. |
| 7,260,466 B2 | 8/2007 | Fujii |
| 7,260,935 B2 | 8/2007 | Colibaba-Evulet et al. |
| 7,260,937 B2 | 8/2007 | Kothnur et al. |
| 7,269,939 B2 | 9/2007 | Kothnur et al. |
| 7,269,952 B2 | 9/2007 | Arar et al. |
| 7,269,953 B2 | 9/2007 | Gadde et al. |
| 7,275,025 B2 | 9/2007 | Chan et al. |
| 7,278,266 B2 | 10/2007 | Taware et al. |
| 7,284,378 B2 | 10/2007 | Amond, III et al. |
| 7,288,921 B2 | 10/2007 | Huff et al. |
| 7,299,279 B2 | 11/2007 | Sadaghiany |
| 7,302,334 B2 | 11/2007 | Hook et al. |
| 7,320,213 B2 | 1/2008 | Shah et al. |
| 7,334,413 B2 | 2/2008 | Myhre |
| 7,349,765 B2 | 3/2008 | Reaume et al. |
| 7,353,084 B2 | 4/2008 | Schaper et al. |
| 7,356,383 B2 | 4/2008 | Pechtl et al. |
| 7,368,827 B2 | 5/2008 | Kulkarni et al. |
| 7,369,932 B2 | 5/2008 | Kim et al. |
| 7,377,036 B2 | 5/2008 | Johnson et al. |
| 7,385,300 B2 | 6/2008 | Huff et al. |
| 7,389,151 B2 | 6/2008 | Badami et al. |
| 7,389,643 B2 | 6/2008 | Simons et al. |
| 7,406,820 B2 | 8/2008 | Critchley et al. |
| 7,409,855 B2 | 8/2008 | Flint |
| 7,415,779 B2 | 8/2008 | St. Louis et al. |
| 7,435,080 B2 | 10/2008 | Joklik et al. |
| 7,437,871 B2 | 10/2008 | Cook |
| 7,441,398 B2 | 10/2008 | Ziminsky et al. |
| 7,441,448 B2 | 10/2008 | Volponi |
| 7,451,601 B2 | 11/2008 | Taware et al. |
| 7,456,517 B2 | 11/2008 | Campbell et al. |
| 7,457,688 B2 | 11/2008 | Szepek et al. |
| 7,457,710 B2 | 11/2008 | Schuermans et al. |
| 7,461,509 B2 | 12/2008 | Mick et al. |
| 7,471,996 B2 | 12/2008 | Bartel |
| 7,474,080 B2 | 1/2009 | Huff et al. |
| 7,478,525 B2 | 1/2009 | Iya et al. |
| 7,481,100 B2 | 1/2009 | Ponziani et al. |
| 7,484,369 B2 | 2/2009 | Myhre |
| 7,486,864 B2 | 2/2009 | Diatzikis |
| 7,487,642 B2 | 2/2009 | Joshi et al. |
| 7,489,835 B1 | 2/2009 | Xia et al. |
| 7,490,596 B2 | 2/2009 | Yasui et al. |
| 7,493,207 B2 | 2/2009 | Yasui et al. |
| 7,493,752 B2 | 2/2009 | Horswill et al. |
| 7,503,177 B2 | 3/2009 | Bland et al. |
| 7,509,810 B2 | 3/2009 | Smith et al. |
| 7,512,476 B2 | 3/2009 | Rosi et al. |
| 7,513,099 B2 | 4/2009 | Nuding et al. |
| 7,515,995 B2 | 4/2009 | Toth |
| 7,530,216 B2 | 5/2009 | Tsuzuki et al. |
| 7,530,260 B2 | 5/2009 | Dooley |
| 7,534,033 B2 | 5/2009 | Prinz et al. |
| 7,536,992 B1 | 5/2009 | Wieshuber et al. |
| 7,546,741 B2 | 6/2009 | Sasao et al. |
| 7,562,532 B2 | 7/2009 | Diaz et al. |
| 7,565,238 B2 | 7/2009 | Nakagawa et al. |
| 7,565,792 B2 | 7/2009 | Tanaka et al. |
| 7,565,805 B2 | 7/2009 | Steber et al. |

(56) References Cited

U.S. PATENT DOCUMENTS

| | | |
|---|---|---|
| 7,568,349 B2 | 8/2009 | Hadley |
| 7,571,045 B2 | 8/2009 | Muramatsu et al. |
| 7,577,549 B2 | 8/2009 | Osborn et al. |
| 7,582,359 B2 | 9/2009 | Sabol et al. |
| 7,584,617 B2 | 9/2009 | Bland et al. |
| 7,591,135 B2 | 9/2009 | Stewart |
| 7,600,369 B2 | 10/2009 | Tanaka et al. |
| 7,610,745 B2 | 11/2009 | Fujii et al. |
| 7,610,746 B2 | 11/2009 | Fujii et al. |
| 7,617,686 B2 | 11/2009 | Lilley et al. |
| 7,617,687 B2 | 11/2009 | West et al. |
| 7,620,461 B2 | 11/2009 | Frederick et al. |
| 7,623,999 B2 | 11/2009 | Clayton |
| 7,628,062 B2 | 12/2009 | Healy et al. |
| 7,628,078 B2 | 12/2009 | Matsui et al. |
| 7,630,820 B2 | 12/2009 | Sims et al. |
| 7,632,059 B2 | 12/2009 | Tisenchek et al. |
| 7,640,725 B2 | 1/2010 | Bland et al. |
| 7,640,793 B2 | 1/2010 | McCall et al. |
| 7,644,574 B2 | 1/2010 | Feiz |
| 7,644,577 B2 | 1/2010 | Linna et al. |
| 7,647,778 B2 | 1/2010 | Zewde et al. |
| 7,650,050 B2 | 1/2010 | Haffner et al. |
| 7,665,670 B2 | 2/2010 | Ahmed |
| 7,677,075 B2 | 3/2010 | Nies |
| 7,681,440 B2 | 3/2010 | Thomassin et al. |
| 7,684,880 B2 | 3/2010 | Bach |
| 7,690,204 B2 | 4/2010 | Drnevich et al. |
| 7,692,324 B2 | 4/2010 | Malakhova et al. |
| 7,693,147 B2 | 4/2010 | Williams et al. |
| 7,693,643 B2 | 4/2010 | Kim et al. |
| 7,698,030 B2 | 4/2010 | Martin |
| 7,698,897 B2 | 4/2010 | Rowe et al. |
| 7,702,447 B2 | 4/2010 | Volponi |
| 7,703,288 B2 | 4/2010 | Rogers |
| 7,707,833 B1 | 5/2010 | Bland et al. |
| 7,712,313 B2 | 5/2010 | Kojovic et al. |
| 7,730,726 B2 | 6/2010 | Asti et al. |
| 7,751,943 B2 | 7/2010 | Bollhalder et al. |
| 7,756,626 B2 | 7/2010 | Fujii et al. |
| 7,757,491 B2 | 7/2010 | Hessler |
| 7,765,856 B2 | 8/2010 | Wilbraham |
| 7,769,507 B2 | 8/2010 | Volponi et al. |
| 7,775,052 B2 | 8/2010 | Cornwell et al. |
| 7,788,014 B2 | 8/2010 | Volponi |
| 7,797,113 B2 | 9/2010 | Yoshida et al. |
| 7,805,922 B2 | 10/2010 | Bland |
| 7,818,970 B2 | 10/2010 | Price et al. |
| 7,822,512 B2 | 10/2010 | Thatcher et al. |
| 7,822,576 B2 | 10/2010 | Flint et al. |
| 7,823,388 B2 | 11/2010 | Murakami |
| 7,826,954 B2 | 11/2010 | Muramatsu et al. |
| 7,832,210 B2 | 11/2010 | Fecamp et al. |
| 7,836,676 B2 | 11/2010 | Futa, Jr. et al. |
| 7,837,429 B2 | 11/2010 | Zhang et al. |
| 7,840,336 B2 | 11/2010 | Muramatsu et al. |
| 7,841,180 B2 | 11/2010 | Kraemer et al. |
| 7,841,317 B2 | 11/2010 | Williams et al. |
| 7,853,433 B2 | 12/2010 | He et al. |
| 7,853,441 B2 | 12/2010 | Volponi et al. |
| 7,861,578 B2 | 1/2011 | Adibhatla et al. |
| 7,871,237 B2 | 1/2011 | Bunce et al. |
| 7,878,004 B2 | 2/2011 | Davies et al. |
| 7,886,875 B2 | 2/2011 | Shevchencko et al. |
| 7,895,821 B2 | 3/2011 | Annigeri et al. |
| 7,908,072 B2 | 3/2011 | Tonno et al. |
| 7,927,095 B1 | 4/2011 | Chorpening et al. |
| 7,942,038 B2 | 5/2011 | Ziminsky et al. |
| 7,945,523 B2 | 5/2011 | Hofmann et al. |
| 7,950,216 B2 | 5/2011 | Dooley et al. |
| 7,957,845 B2 | 6/2011 | Chen |
| 7,966,100 B2 | 6/2011 | Beekhuis |
| 7,966,801 B2 | 6/2011 | Umeh et al. |
| 7,966,802 B2 | 6/2011 | Szepek et al. |
| 7,966,804 B2 | 6/2011 | Snow |
| 7,966,834 B2 | 6/2011 | Myhre |
| 7,966,995 B2 | 6/2011 | Futa, Jr. et al. |
| 7,970,570 B2 | 6/2011 | Lynch et al. |
| 7,975,533 B2 | 7/2011 | Andrie |
| 7,980,082 B2 | 7/2011 | Ziminsky et al. |
| 7,983,829 B2 | 7/2011 | Muramatsu et al. |
| 7,997,083 B2 | 8/2011 | Meadows et al. |
| 8,001,761 B2 | 8/2011 | Myers, Jr. et al. |
| 8,005,575 B2 | 8/2011 | Kirchhof |
| 8,014,929 B2 | 9/2011 | Page et al. |
| 8,015,791 B2 | 9/2011 | Finkbeiner |
| 8,015,792 B2 | 9/2011 | Raver |
| 8,018,590 B2 | 9/2011 | Davis, Jr. et al. |
| 8,024,934 B2 | 9/2011 | Abreu et al. |
| 8,024,964 B2 | 9/2011 | Healy et al. |
| 8,028,512 B2 | 10/2011 | Mendoza et al. |
| 8,033,117 B2 | 10/2011 | Ziminsky et al. |
| 8,037,688 B2 | 10/2011 | Hagen et al. |
| 8,042,340 B2 | 10/2011 | Ma et al. |
| 8,056,062 B2 | 11/2011 | Bowers et al. |
| 8,056,317 B2 | 11/2011 | Feiz |
| 8,061,118 B2 | 11/2011 | Kothnur et al. |
| 8,068,997 B2 | 11/2011 | Ling et al. |
| 8,099,181 B2 | 1/2012 | Sterzing et al. |
| 8,145,403 B2 | 3/2012 | Fuller et al. |
| 8,417,433 B2 | 4/2013 | Gauthier |
| 8,457,936 B2 | 6/2013 | Harris |
| 9,097,185 B2 | 8/2015 | Demougeot |
| 9,494,492 B2 | 11/2016 | Brunschwig et al. |
| 2002/0084702 A1 | 7/2002 | Balas |
| 2002/0099474 A1 | 7/2002 | Khesin |
| 2002/0107614 A1 | 8/2002 | Tanaka |
| 2002/0142257 A1 | 10/2002 | Eroglu et al. |
| 2002/0198629 A1 | 12/2002 | Ellis |
| 2003/0009401 A1 | 1/2003 | Ellis |
| 2003/0018394 A1 | 1/2003 | McCarthy et al. |
| 2003/0036820 A1 | 2/2003 | Yellepeddy et al. |
| 2003/0037550 A1 | 2/2003 | Fassbender |
| 2003/0056517 A1 | 3/2003 | Brushwood et al. |
| 2003/0093184 A1 | 5/2003 | Tanaka |
| 2003/0120444 A1 | 6/2003 | Zison et al. |
| 2003/0144787 A1 | 7/2003 | Davis, Jr. et al. |
| 2003/0211432 A1 | 11/2003 | Gutmark et al. |
| 2003/0233831 A1 | 12/2003 | Suenaga et al. |
| 2004/0011051 A1 | 1/2004 | Ryan et al. |
| 2004/0025512 A1 | 2/2004 | Davis, Jr. et al. |
| 2004/0088060 A1 | 5/2004 | Renou et al. |
| 2004/0102872 A1 | 5/2004 | Schick et al. |
| 2004/0103068 A1 | 5/2004 | Eker et al. |
| 2004/0128111 A1 | 7/2004 | Lang |
| 2004/0128266 A1 | 7/2004 | Yellepeddy et al. |
| 2004/0159142 A1 | 8/2004 | Knott et al. |
| 2004/0191914 A1 | 9/2004 | Widmer et al. |
| 2004/0194468 A1 | 10/2004 | Ryan et al. |
| 2004/0197239 A1 | 10/2004 | Mirkovic et al. |
| 2004/0249515 A1 | 12/2004 | Johnson et al. |
| 2004/0255595 A1 | 12/2004 | Morgan et al. |
| 2005/0011179 A1 | 1/2005 | Ooka et al. |
| 2005/0021710 A1 | 1/2005 | Johnson et al. |
| 2005/0022499 A1 | 2/2005 | Belokon et al. |
| 2005/0038570 A1 | 2/2005 | Grauer |
| 2005/0049775 A1 | 3/2005 | Mooney |
| 2005/0061004 A1 | 3/2005 | Colibaba-Evulet et al. |
| 2005/0107941 A1 | 5/2005 | Healy |
| 2005/0107942 A1 | 5/2005 | Nomura et al. |
| 2005/0114010 A1 | 5/2005 | Healy et al. |
| 2005/0143865 A1 | 6/2005 | Gardner |
| 2005/0144955 A1 | 7/2005 | Handelsman et al. |
| 2005/0159849 A9 | 7/2005 | Johnson et al. |
| 2005/0160717 A1 | 7/2005 | Sprouse et al. |
| 2005/0188745 A1 | 9/2005 | Staphanos et al. |
| 2005/0203670 A1 | 9/2005 | Kusaka et al. |
| 2005/0217276 A1 | 10/2005 | Colibaba-Evulet et al. |
| 2005/0223713 A1 | 10/2005 | Ziminsky et al. |
| 2005/0247064 A1 | 11/2005 | Lieuwen |
| 2005/0257514 A1 | 11/2005 | Morgan et al. |
| 2005/0267642 A1 | 12/2005 | Whiffen et al. |
| 2005/0268617 A1 | 12/2005 | Amond, III et al. |
| 2005/0274115 A1 | 12/2005 | Pearce |

(56) References Cited

U.S. PATENT DOCUMENTS

| | | |
|---|---|---|
| 2005/0276306 A1 | 12/2005 | Mick et al. |
| 2005/0278076 A1 | 12/2005 | Barbir et al. |
| 2006/0040225 A1 | 2/2006 | Garay et al. |
| 2006/0041368 A1 | 2/2006 | Williams et al. |
| 2006/0080965 A1 | 4/2006 | Healy |
| 2006/0106501 A1 | 5/2006 | Gomer et al. |
| 2006/0137353 A1 | 6/2006 | Lieuwen et al. |
| 2006/0149423 A1 | 7/2006 | Barnicki et al. |
| 2006/0178782 A1 | 8/2006 | Pechtl et al. |
| 2006/0190139 A1 | 8/2006 | Reaume et al. |
| 2006/0228596 A1 | 10/2006 | Campbell et al. |
| 2006/0230743 A1 | 10/2006 | Sprouse et al. |
| 2006/0254279 A1 | 11/2006 | Taware et al. |
| 2006/0260319 A1 | 11/2006 | Ziminsky et al. |
| 2006/0288706 A1 | 12/2006 | Ziminksy et al. |
| 2007/0021899 A1 | 1/2007 | Griffin et al. |
| 2007/0055392 A1 | 3/2007 | D' Amato et al. |
| 2007/0067068 A1 | 3/2007 | Havlena et al. |
| 2007/0074519 A1 | 4/2007 | Hadley |
| 2007/0084217 A1 | 4/2007 | Nicholls |
| 2007/0089425 A1 | 4/2007 | Motter et al. |
| 2007/0113560 A1 | 5/2007 | Steber et al. |
| 2007/0119147 A1 | 5/2007 | Cornwell et al. |
| 2007/0119178 A1 | 5/2007 | Berenbrink et al. |
| 2007/0125088 A1 | 6/2007 | Kothnur et al. |
| 2007/0141417 A1 | 6/2007 | Bitoh |
| 2007/0142975 A1 | 6/2007 | Piche |
| 2007/0151252 A1 | 7/2007 | Cornwell et al. |
| 2007/0151257 A1 | 7/2007 | Maier et al. |
| 2007/0157620 A1 | 7/2007 | Healy et al. |
| 2007/0157624 A1 | 7/2007 | Bland et al. |
| 2007/0162189 A1 | 7/2007 | Huff et al. |
| 2007/0163267 A1 | 7/2007 | Flohr et al. |
| 2007/0180831 A1 | 8/2007 | Bland |
| 2007/0186875 A1 | 8/2007 | Jonson |
| 2007/0198132 A1 | 8/2007 | Yamamoto et al. |
| 2007/0213878 A1 | 9/2007 | Chen |
| 2007/0214796 A1 | 9/2007 | Bland et al. |
| 2007/0214797 A1 | 9/2007 | Bland et al. |
| 2007/0214798 A1 | 9/2007 | Frevel |
| 2007/0220896 A1 | 9/2007 | Varatharajan et al. |
| 2007/0227148 A1 | 10/2007 | Bland et al. |
| 2007/0227155 A1 | 10/2007 | Nemet et al. |
| 2007/0240648 A1 | 10/2007 | Badami et al. |
| 2007/0245707 A1 | 10/2007 | Pashley |
| 2007/0255459 A1 | 11/2007 | Althaus |
| 2007/0267997 A1 | 11/2007 | Kanazawa et al. |
| 2007/0271024 A1 | 11/2007 | Fujii et al. |
| 2007/0271927 A1 | 11/2007 | Myers et al. |
| 2007/0298295 A1 | 12/2007 | Daly et al. |
| 2008/0000214 A1 | 1/2008 | Kothnur et al. |
| 2008/0004721 A1 | 1/2008 | Huff et al. |
| 2008/0016875 A1 | 1/2008 | Ryan et al. |
| 2008/0016876 A1 | 1/2008 | Colibaba-Evulet et al. |
| 2008/0034731 A1 | 2/2008 | Pashley |
| 2008/0047275 A1 | 2/2008 | Ziminksy et al. |
| 2008/0071427 A1 | 3/2008 | Szepek et al. |
| 2008/0083228 A1 | 4/2008 | Myhre |
| 2008/0098746 A1 | 5/2008 | Iasillo et al. |
| 2008/0118343 A1 | 5/2008 | Arthur et al. |
| 2008/0134684 A1 | 6/2008 | Umeh et al. |
| 2008/0141643 A1 | 6/2008 | Varatharajan et al. |
| 2008/0154474 A1 | 6/2008 | Iasillo et al. |
| 2008/0177456 A1 | 7/2008 | Hill et al. |
| 2008/0177505 A1 | 7/2008 | Volponi |
| 2008/0243352 A1 | 10/2008 | Healy |
| 2008/0245980 A1 | 10/2008 | Diatzikis |
| 2008/0260519 A1 | 10/2008 | Dooley |
| 2008/0264034 A1 | 10/2008 | Iya et al. |
| 2008/0270003 A1 | 10/2008 | Sims et al. |
| 2008/0281483 A1 | 11/2008 | Litt |
| 2008/0281562 A1 | 11/2008 | Chou et al. |
| 2008/0288120 A1 | 11/2008 | Lindenmuth et al. |
| 2008/0288928 A1 | 11/2008 | Bowers |
| 2008/0289314 A1 | 11/2008 | Snider et al. |
| 2008/0301499 A1 | 12/2008 | Grichnik |
| 2009/0005950 A1 | 1/2009 | Scalia, Jr. |
| 2009/0005951 A1 | 1/2009 | Frederick, II et al. |
| 2009/0005952 A1 | 1/2009 | Tonno et al. |
| 2009/0007564 A1 | 1/2009 | Suzuki et al. |
| 2009/0037036 A1 | 2/2009 | Nguyen et al. |
| 2009/0042151 A1 | 2/2009 | Joklik et al. |
| 2009/0043485 A1 | 2/2009 | Banks |
| 2009/0044513 A1 | 2/2009 | Fuller et al. |
| 2009/0046762 A1 | 2/2009 | Henshaw et al. |
| 2009/0055070 A1 | 2/2009 | De et al. |
| 2009/0055071 A1 | 2/2009 | Way et al. |
| 2009/0055130 A1 | 2/2009 | Pandey et al. |
| 2009/0055145 A1 | 2/2009 | Volponi et al. |
| 2009/0071118 A1 | 3/2009 | Ma et al. |
| 2009/0071442 A1 | 3/2009 | Emo et al. |
| 2009/0082919 A1 | 3/2009 | Hershey et al. |
| 2009/0105852 A1 | 4/2009 | Wintrich et al. |
| 2009/0112441 A1 | 4/2009 | Perschi et al. |
| 2009/0125207 A1 | 5/2009 | Nomura et al. |
| 2009/0126367 A1 | 5/2009 | Chhabra et al. |
| 2009/0132145 A1 | 5/2009 | Angeby |
| 2009/0138170 A1 | 5/2009 | Nemet et al. |
| 2009/0141349 A1 | 6/2009 | Myhre |
| 2009/0142717 A1 | 6/2009 | Lavelle |
| 2009/0150040 A1 | 6/2009 | Rofka |
| 2009/0182441 A1 | 7/2009 | Wintrich et al. |
| 2009/0183551 A1 | 7/2009 | Fattic et al. |
| 2009/0193788 A1 | 8/2009 | Szepek et al. |
| 2009/0222187 A1 | 9/2009 | Martling et al. |
| 2009/0223210 A1 | 9/2009 | Klejeski et al. |
| 2009/0223225 A1 | 9/2009 | Kraemer et al. |
| 2009/0226327 A1 | 9/2009 | Little et al. |
| 2009/0234554 A1 | 9/2009 | Buehman |
| 2009/0265049 A1 | 10/2009 | Wise et al. |
| 2009/0266150 A1 | 10/2009 | Novis |
| 2009/0271149 A1 | 10/2009 | Brown |
| 2009/0271340 A1 | 10/2009 | Schneegass et al. |
| 2009/0292437 A1 | 11/2009 | Cloft |
| 2009/0293597 A1 | 12/2009 | Andrie |
| 2009/0301097 A1 | 12/2009 | Deuker et al. |
| 2009/0313056 A1 | 12/2009 | Beekhuis |
| 2009/0320492 A1 | 12/2009 | Carin et al. |
| 2009/0326781 A1 | 12/2009 | Mukavetz et al. |
| 2009/0326782 A1 | 12/2009 | Nunn |
| 2009/0326784 A1 | 12/2009 | Tanner et al. |
| 2010/0011851 A1 | 1/2010 | Healy et al. |
| 2010/0018183 A1 | 1/2010 | Feiz |
| 2010/0024393 A1 | 2/2010 | Chi et al. |
| 2010/0024536 A1 | 2/2010 | Adibhatla et al. |
| 2010/0031633 A1 | 2/2010 | Kitazawa |
| 2010/0034635 A1 | 2/2010 | Erickson et al. |
| 2010/0042367 A1 | 2/2010 | Brown |
| 2010/0050591 A1 | 3/2010 | Nemet et al. |
| 2010/0070098 A1 | 3/2010 | Sterzing et al. |
| 2010/0077970 A1 | 4/2010 | Kumar et al. |
| 2010/0082267 A1 | 4/2010 | Schimert et al. |
| 2010/0106462 A1 | 4/2010 | Liu |
| 2010/0117859 A1 | 5/2010 | Mitchell et al. |
| 2010/0122535 A1 | 5/2010 | Finkbeiner |
| 2010/0161154 A1 | 6/2010 | Moeckly et al. |
| 2010/0162678 A1 | 7/2010 | Annigeri |
| 2010/0162724 A1 | 7/2010 | Myers et al. |
| 2010/0170219 A1 | 7/2010 | Venkataraman et al. |
| 2010/0170244 A1 | 7/2010 | Brooks et al. |
| 2010/0170261 A1 | 7/2010 | Stieger et al. |
| 2010/0172017 A1 | 7/2010 | Kim et al. |
| 2010/0198419 A1 | 8/2010 | Sonoda et al. |
| 2010/0199680 A1 | 8/2010 | Nomura et al. |
| 2010/0204931 A1 | 8/2010 | Ling et al. |
| 2010/0205976 A1 | 8/2010 | Nag et al. |
| 2010/0215480 A1 | 8/2010 | Leach et al. |
| 2010/0220182 A1 | 9/2010 | Krull et al. |
| 2010/0223933 A1 | 9/2010 | Umeh et al. |
| 2010/0229524 A1 | 9/2010 | Bhatnagar et al. |
| 2010/0241331 A1 | 9/2010 | Duke et al. |
| 2010/0242436 A1 | 9/2010 | Tangirala et al. |
| 2010/0242492 A1 | 9/2010 | Sloat et al. |
| 2010/0262263 A1 | 10/2010 | Karaffa et al. |

(56) References Cited

U.S. PATENT DOCUMENTS

| | | |
|---|---|---|
| 2010/0262265 A1 | 10/2010 | Karaffa |
| 2010/0262352 A1 | 10/2010 | Kuwahara et al. |
| 2010/0262401 A1 | 10/2010 | Pfeifer |
| 2010/0269515 A1 | 10/2010 | Kishi et al. |
| 2010/0275609 A1 | 11/2010 | Snider |
| 2010/0278639 A1 | 11/2010 | Hood et al. |
| 2010/0280730 A1 | 11/2010 | Page et al. |
| 2010/0286889 A1 | 11/2010 | Childers |
| 2010/0286890 A1 | 11/2010 | Chandler |
| 2010/0287943 A1 | 11/2010 | McMahan et al. |
| 2010/0287947 A1 | 11/2010 | Rogers et al. |
| 2010/0300108 A1 | 12/2010 | Demougeot et al. |
| 2010/0301615 A1 | 12/2010 | Yamashita et al. |
| 2010/0307157 A1 | 12/2010 | Bilton et al. |
| 2010/0307158 A1 | 12/2010 | Bilton et al. |
| 2010/0313572 A1 | 12/2010 | McManus et al. |
| 2010/0326080 A1 | 12/2010 | Rogers et al. |
| 2011/0004356 A1 | 1/2011 | Garcia |
| 2011/0004390 A1 | 1/2011 | Nomura et al. |
| 2011/0048022 A1 | 3/2011 | Singh et al. |
| 2011/0052370 A1 | 3/2011 | Karpman et al. |
| 2011/0054704 A1 | 3/2011 | Karpman et al. |
| 2011/0056181 A1 | 3/2011 | Dinu |
| 2011/0077783 A1 | 3/2011 | Karpman et al. |
| 2011/0079015 A1 | 4/2011 | Geis et al. |
| 2011/0079020 A1 | 4/2011 | Durocher et al. |
| 2011/0137536 A1 | 6/2011 | Tonno et al. |
| 2011/0138766 A1 | 6/2011 | ELKady et al. |
| 2011/0138813 A1 | 6/2011 | Sandvik et al. |
| 2011/0146232 A1 | 6/2011 | Westervelt et al. |
| 2011/0153295 A1 | 6/2011 | Yerramalla et al. |
| 2011/0154826 A1 | 6/2011 | Iwasaki et al. |
| 2011/0154828 A1 | 6/2011 | Iwasaki et al. |
| 2011/0156391 A1 | 6/2011 | Kirchner et al. |
| 2011/0160979 A1 | 6/2011 | Muller |
| 2011/0172893 A1 | 7/2011 | Nomura et al. |
| 2011/0179802 A1 | 7/2011 | Snider et al. |
| 2011/0191004 A1 | 8/2011 | Nomura et al. |
| 2011/0196593 A1 | 8/2011 | Jiang et al. |
| 2011/0197594 A1 | 8/2011 | Khosla et al. |
| 2011/0214644 A1 | 9/2011 | Barta et al. |
| 2011/0215775 A1 | 9/2011 | Engelhardt et al. |
| 2011/0224959 A1 | 9/2011 | Zhang et al. |
| 2011/0225976 A1 | 9/2011 | Ziminsky et al. |
| 2011/0239621 A1 | 10/2011 | Meneely et al. |
| 2011/0247314 A1 | 10/2011 | Chila et al. |
| 2011/0247406 A1 | 10/2011 | Grosse-Laxzen et al. |
| 2011/0262334 A1 | 10/2011 | Kraemer et al. |
| 2011/0265487 A1 | 11/2011 | Gauthier et al. |
| 2011/0270502 A1 | 11/2011 | Demougeot et al. |
| 2011/0270503 A1 | 11/2011 | Stuttaford et al. |
| 2011/0277482 A1 | 11/2011 | Mosley et al. |
| 2011/0277539 A1 | 11/2011 | Meerbeck et al. |
| 2011/0289932 A1 | 12/2011 | Thompson |
| 2011/0289934 A1 | 12/2011 | Desabhatla |
| 2012/0221193 A1 | 8/2012 | Delaye et al. |
| 2012/0275899 A1 | 11/2012 | Chandler |
| 2013/0113913 A1 | 5/2013 | Scheid et al. |
| 2013/0139520 A1 | 6/2013 | Masse et al. |
| 2013/0173074 A1 | 7/2013 | Chandler |
| 2013/0274898 A1 | 10/2013 | Thatikonda et al. |

FOREIGN PATENT DOCUMENTS

| | | |
|---|---|---|
| CN | 101438367 | 5/2009 |
| EP | 0 306 064 | 3/1989 |
| EP | 1067338 A2 | 1/2001 |
| EP | 1199519 | 4/2002 |
| EP | 1348908 | 10/2003 |
| EP | 1788309 | 5/2007 |
| EP | 1808589 | 7/2007 |
| EP | 1909032 A2 | 4/2008 |
| EP | 2 014 898 | 1/2009 |
| EP | 2204561 A2 | 7/2010 |
| EP | 2249007 | 11/2010 |
| EP | 2333280 A2 | 6/2011 |
| GB | 2 272 783 | 5/1994 |
| JP | 61036809 | 2/1986 |
| JP | 08-042361 | 2/1996 |
| JP | 08-210635 A2 | 8/1996 |
| JP | 2006-144796 | 6/2006 |
| JP | 2007-138949 | 6/2007 |
| JP | 2009-296994 | 12/2009 |
| JP | 2010-103781 | 5/2010 |
| JP | 2010-159954 | 7/2010 |
| RU | 2 162 953 | 2/2001 |
| RU | 2 252 328 | 5/2005 |
| RU | 2 280 775 | 7/2006 |
| RU | 2 287 074 | 11/2006 |
| RU | 2 322 601 | 4/2008 |
| TW | 385352 | 3/2000 |
| TW | 200928079 | 7/2009 |
| WO | 2013/151782 A1 | 10/2013 |

OTHER PUBLICATIONS

Examination Report dated Oct. 31, 2016, directed to corresponding Gulf Cooperation Council Application No. GC 2013-23626; 6 pages.

Examination Report from corresponding GCC Application No. GC 2013-24867 filed Jul. 3, 2013; dated Sep. 19, 2017.

Yukimoto et al. "A new PID controller tuning system and its application to a flue gas temperature control in a gas turbine power plant," Control Applications [Online] 1998, 2, pp. 1373-1377.

Doris Saez, Freddy Milla and Luis S. Vargas, "Fuzzy Predictive Supervisory Control Based on Genetic Algorithms for Gas Turbines of Combined Cycle Power Plants," IEEE Transactions of Energy Conversion, vol. 22, No. 3, Sep. 2007.

John Xia and Rick Antos, "SGT6-5000F (W501F) 3 Million Hours Fleet Operational Experience," Power-Gen International 2006—Orlando, FL, Nov. 2006.

Angello, L., "Tuning Approaches for DLN Combustor Performance and Reliability" Technical Update, Electric Power Research Institute (EPRI), Mar. 2005.

Jesse Sewell, Pete Sobieski, and Craig Beers, "Application of Continuous Combustion Dynamics Monitoring on Large Industrial Gas Turbines," ASME Conf. Proc. 2004, 807 (2004).

Bland, R., Ryan, W., Abou-Jaoude, K., Bandaru, R., Harris, A., Rising, B., "Siemens W501F Gas Turbine: Ultra Low NOx Combustion System Development," Siemens Westinghouse, 2004.

Sébastien Candel, "Combustion dynamics and control: Progress and challenges," Proceedings of the Combustion Institute, vol. 29, Issue 1, 2002, pp. 1-28.

Yoshi Usune, Masao Terazaki, Yasuoki Tomita, Jun-Hee Lee, "Technical Approach to Higher Availability of Gas Turbine Combined Cycle".

Andersen, Helmer, "Early Detection of Combustor Pulsations and Optimized Operation Through On-Line Monitoring Systems," International Gas Turbine and Aeroengine Congress and Exhibition, May 2000.

Corbett, N.C., "Remote Monitoring and Control of Advanced Gas Turbines," Computing & Control Engineering Journal, Apr. 2001.

Jeffrey D. Willis and A. John Moran, "Industrial RB211 DLE Gas Turbine Combustion Update," Proceedings of ASME Turboexpo, 2000.

Thomas Scarinci and John L. Halpin, "Industrial Trent Combustor—Combustion Noise Characteristics," International Gas Turbine & Aeroengine Congress & Exhibition, 1999.

Frank J. Brooks, "GE Gas Turbine Performance Characteristics," GE Power Systems, GER-3567H, Oct. 2000.

Notice of Allowance and Fees due dated Dec. 24, 2015, in related U.S. Appl. No. 13/855,220.

Office Action dated Nov. 19, 2015 in corresponding Chinese Application No. 201310136070.5, along with its English Translation.

Office Action dated Jan. 15, 2015 from related U.S. Appl. No. 13/855,220.

Office Action along with Search Report and its English Translation dated May 30, 2015, received in related Taiwanese Application No. 102106081.

(56) References Cited

OTHER PUBLICATIONS

Office Action along with Search Report and its English Translation dated May 28, 2015, received in related Taiwanese Application No. 102106078.
Examiner's Requisition from corresponding Canadian Application No. 2,817,609.
Communication dated Jun. 20, 2013 issued in corresponding European Application No. 10159823.3 with attached Search Report.
Int'l Search Report dated Jun. 20, 2013 issued in corresponding Int'l Application No. PCT/US2013/026291.
Int'l Search Report dated Jun. 20, 2013 issued in corresponding Int'l Application No. PCT/US2013/026295.
Office Action w/ English Translation dated Jun. 9, 2014 issued in Corresponding Mexican Application No. MX/a/2010/004869.
Search Report dated Apr. 20, 2014 issued in Corresponding Gulf Cooperation Council Application No. 2010/15815.
Office Action dated Feb. 27, 2013 issued in corresponding Chinese Application No. 201010177967.9 with attached Search Report.
Examination Report dated Dec. 31, 2015 in corresponding Indian Application No. 1284/MUM/2010.
Final Office Action from counterpart U.S. Appl. No. 14/992,539, dated Aug. 30, 2018.
Office Action from counterpart Canadian Application No. 2,901,077 dated Nov. 14, 2018.

AUTOMATED TUNING OF MULTIPLE FUEL GAS TURBINE COMBUSTION SYSTEMS

CROSS-REFERENCE TO RELATED APPLICATIONS

This application is a continuation-in-part of U.S. application Ser. No. 13/767,920, filed on Feb. 15, 2013, which is a continuation-in-part of U.S. application Ser. No. 13/542,222, filed on Jul. 5, 2012, which is a continuation-in-part of U.S. application Ser. No. 12/463,060 filed on May 8, 2009. This application also claims the benefit of U.S. Application Ser. No. 61/601,871, filed on Feb. 22, 2012. The contents of U.S. application Ser. Nos. 12/463,060, 13/542,222, 13/767,920 and 61/601,871 are hereby incorporated by reference in their entirety.

TECHNICAL FIELD

The present disclosure relates to an automated system for sensing the operating condition of a combustion system and to making automated, preset adjustments to achieve desired operating conditions of the turbine. The present disclosure also relates to turbines operating using fuels having varying thermophysical properties.

BACKGROUND

Lean premixed combustion systems have been deployed on land based and marine fuel turbine engines to reduce emissions, such as NOx and CO. These systems have been successful and, in some cases, produce emission levels that are at the lower limits of measurement capabilities, approximately 1 to 3 parts per million (ppm) of NOx and CO, Although these systems are a great benefit from a standpoint of emission production, the operational envelope of the systems is substantially reduced when compared to more conventional combustion systems. As a consequence, the control of fuel conditions, distribution and injection into the combustion zones has become a critical operating parameter and requires frequent adjustment, when ambient atmospheric conditions, such as temperature, humidity and pressure, change. In addition to ambient condition changes, variation in the fuel's thermophysical properties will also change operational conditions leading to another source of variation that requires adjustment of the fuel turbine operational settings. The re-adjustment of the combustion fuel conditions, distribution and injection is termed tuning.

Controlled operation of a combustion system generally employs a manual setting of the operational control settings of a combustor to yield an average operational condition. These settings may be input through a controller, which as used herein shall refer to any device used to control the operation of a system. Examples include a Distributed Control System (DCS), a fuel turbine controller, a programmable logical controller (PLC), a stand-alone computer with communication to another controller and/or directly to a system.

These settings are satisfactory at the time of the setup, but conditions may change when tuning issues arise and cause an unacceptable operation in a matter of hours or days. Tuning issues are any situation whereby any operational parameters of a system are in excess of acceptable limits. Examples include emissions excursion outside of allowable limits, combustor dynamics excursion outside of allowable limits, or any other tuning event requiring adjustment of a turbine's operational control elements. Other approaches use a formula to predict emissions based on fuel turbine's operating settings and select a set point for fuel distribution and/or overall machine fuel/air ratio, without modifying other control elements, such as fuel temperature. These approaches do not allow for timely variation, do not take advantage of actual dynamics and emission data or do not modify fuel distribution, fuel temperature and/or other turbine operating parameters.

Another variable that impacts the lean premixed combustion system is fuel composition. Sufficient variation in fuel composition will cause a change in the heat release of the lean premixed combustion system. Such change may lead to emissions excursions, unstable combustion processes, or even blow out of the combustion system. Over the last twenty years, many economic and technological changes have occurred which have led to paradigm shifts in key operational inputs into fuel turbine combustion systems—namely fuel compositions requirements. One example of a fuel that is of considerable significance in this area is the use of liquefied natural gas (LNG).

LNG is becoming increasingly more prominent in the United States, Asia and South America. An inherent feature of LNG is variable gas composition as a "batch" of LNG is consumed. Since gas constituents with different volatilities (methane, ethane, propane, etc.) are vaporized at different rates (methane being one of the fastest to volatilize), methane concentrations typically continue to decrease as a "batch" of LNG is vaporized and subsequently consumed.

In addition, fuel producers are continually faced with economic and operational pressures to deliver "non-pipeline quality" fuel to their consumers. To this end, some suppliers have gone as far as to incentivize their customers to burn "off-spec" fuel by offering a reduction in the price per million BTU ($/MMBTU). As used herein, the concept of multiple-fuel burning combustion turbines will be discussed in terms of "pipeline quality" and "non-pipeline quality" fuels. However, it should be understood that while these are common terms to refer to a primary fuel source and a secondary fuel source or sources, they are intended to merely define first and second fuel sources, which may all be of pipeline quality or may not contain any pipeline quality fuel. In many cases, the "pipeline quality" fuel may be more expensive than "non-pipeline quality" but this is not required.

On marine based equipment each refueling of liquid fuel is an opportunity for a change in its physical properties depending on the source and grade of the fuel. Such changes frequently impact emission levels of the gas combustion turbines and may also impact the base load points of the propulsion or power plant.

These above criteria have caused increased pressure on gas turbine operators to operate their equipment using "non-pipeline quality" fuel or non-standard distillate. However, consumption of large quantities of this "off-spec" fuel may have detrimental effects on the combustion turbine system.

In addition, mis-operation of the combustion system manifests itself in augmented pressure pulsations or an increase in combustion dynamics (hereinafter, combustion dynamics may be indicated by the symbol "6P"). Pulsations can have sufficient force to destroy the combustion system and dramatically reduce the life of combustion hardware. Additionally, improper tuning of the combustion system can lead to emission excursions and violate emission permits. Therefore, a means to maintain the stability of the lean premixed combustion systems, on a regular or periodic basis, within the proper operating envelope, is of great value and interest to the industry. Additionally, a system that operates by utilizing near real-time data, taken from the turbine sensors, would have significant value to coordinate modulation of fuel composition fuel distribution, fuel or distillate inlet temperature and/or overall machine fuel/air ratio.

While real-time tuning of a combustion system can provide tremendous operational flexibility and protection for turbine hardware, a combustion system may concurrently experience a number of different operational issues. For example, most turbine operators of lean premixed combustion systems are concerned with exhaust emissions (NOx and CO) as well as combustor dynamics. It is not uncommon for both high NOx emissions and high combustor dynamics to coexist on a turbine. Additionally, tuning in response to one concern can make other constraints worse, for example tuning for low NOx can make combustor dynamics worse, tuning for high CO can make NOx worse, etc. It would be beneficial to provide a system whereby an algorithm is used to compare the current status of all tuning concerns, rank each concern in order of importance, determine the operational concern of most interest, and subsequently commence automated tuning to remediate this dominant operational concern.

Since many operators are incentivized to consume as much of the less expensive "non-pipeline quality" fuel as possible while mixing the non-pipeline quality fuel with pipeline quality natural fuel (and sending the resultant mixture to their fuel turbine combustion system), a means of real-time optimization of the ratio of non-pipeline quality to pipeline quality fuel is also desired.

SUMMARY

The present disclosure includes a method for optimizing the ratio of non-pipeline quality to pipeline quality fuel or marine distillate (fuel blend ratio) for subsequent consumption in a fuel turbine consumption system of the comprising providing a first fuel source and a second fuel source. The method further includes supplying fuel to a combustion turbine in a blend of fuel from the first source and second source. The method also includes sensing the operational parameters of the gas turbine and determining whether the operational parameters are within preset operational limits. Still further, the method includes adjusting the blend of the first fuel source and the second fuel source, based on whether the operational parameters are within the preset operational limits.

The present disclosure also includes a tuning system for automated control of a gas turbine fuel composition through automated modification of a ratio of fuel gas. The tuning system comprises operational turbine controls for operational control elements of the turbine, the turbine controls controlling at least one of turbine fuel distribution or the fuel temperature. Further, the system includes a tuning controller communicating with the controls configured to tune the operation of the turbine in accordance with receiving operational data about the turbine, providing a hierarchy of tuning issues, determining whether sensed operational data is within predetermined operational limits and producing one or more indicators if said operational data is not within predetermined operational limits. The system further includes ranking the one or more indicators to determine dominant tuning concern. Still further, the system includes providing a blend of fuel to a level blend ratio controller, the blend having fuel from at least one of a first and second fuel source ratio controller, the fuel blend ratio controller adjusting the ratio of the first fuel source and the second fuel source according to the blend.

In a further aspect of the disclosure, the system performs a method for determination of the dominant fuel turbine combustion system tuning scenario through the use of Boolean hierarchical logic and multiple levels of control settings.

In another aspect of the disclosure, the method performed relates to automated control of the fuel turbine inlet fuel temperature through automated modification of the fuel temperature control set point within a Distributed Control System (DCS).

In a still further aspect of the disclosure, a method for automated control of a fuel turbine inlet fuel temperature is defined by automated modification of the fuel temperature control set point within the fuel temperature controller. In another aspect of the disclosure a method for communicating turbine control signals to a fuel turbine controller is accomplished through the use of an existing fuel turbine communication link with an external control device, such as, for example a MODBUS Serial or Ethernet communication protocol port existing on the turbine controller for communication with the Distributed Control System (DCS).

In a still further aspect of the disclosure a method for modification of a fuel turbine combustion system is defined by a series of auto tuning settings via a user interface display, which utilizes Boolean-logic toggle switches to select user-desired optimization criteria. The method is preferably defined by optimization criteria based on Optimum Combustion Dynamics, Optimum NOx Emissions, Optimum Power, Optimum Heat Rate, Optimum CO Emissions, Optimum Heat Recovery Steam Generator (HRSG) Life, Optimum Gas Turbine Fuel Blend Ratio or Optimal Gas Turbine Turndown Capability whereby toggling of this switch changes the magnitude of the combustor dynamics control setting(s).

In a still further aspect of the disclosure, and in conjunction with the control scheme outlined above, the controller can be directed to continuously maximize the non-pipeline quality fuel blend ratio. Conversely, if tuning issues arise, the tuning issues cannot be resolved by adjustments to the turbine parameters outlined above, the fuel blend ratio can be altered/reduced,

BRIEF DESCRIPTION OF DRAWINGS

For the purpose of illustrating the disclosure, the drawings show forms that are presently preferred. It should be understood that the disclosure is not limited to the precise arrangements and instrumentalities shown in the drawings of the present disclosure.

DETAILED DESCRIPTION

The present disclosure generally relates to systems and methods for tuning the operation of combustion turbines. In the depicted embodiments, the systems and methods relate to automatic tuning of combustion turbines, such as those used for power generation. Persons of ordinary skill in the art will appreciate that the teachings herein can be readily adapted to other types of combustion turbines. Accordingly, the terms used herein are not intended to be limiting of the embodiments of the present invention. Instead, it will be understood that the embodiments of the present disclosure relate generally to the field of combustion turbines, and in particular for systems, methods and computer readable media for tuning of combustion turbines.

Figure 1:
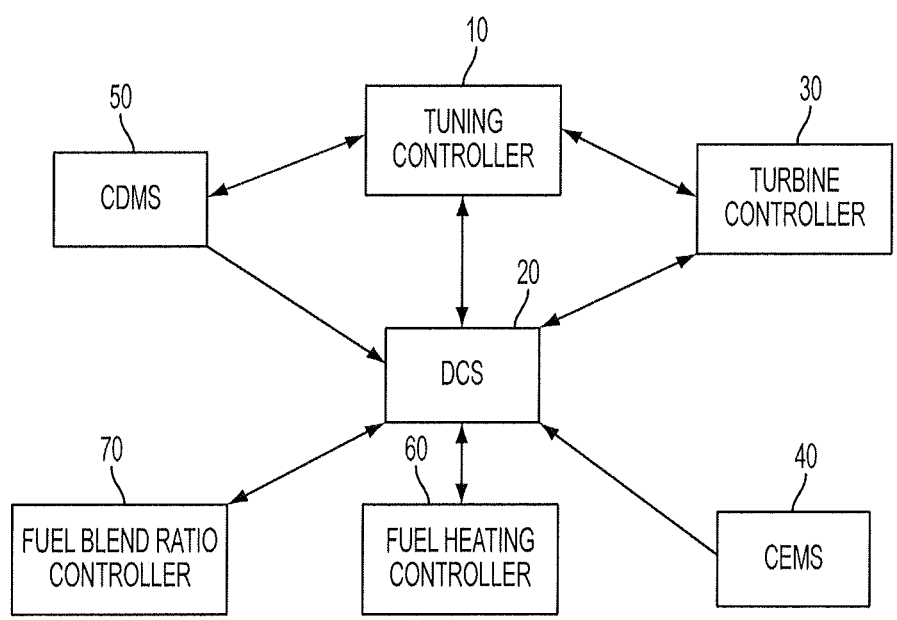
FIG. 1 shows an exemplary embodiment of a schematic representation of an operational plant communication system encompassing the fuel turbine engine system and incorporating a fuel turbine tuning controller, utilizing a DCS as a central control hub.

FIG. 1 is a communication diagram for a gas combustion turbine engine (not shown), within which a tuning controller 10 of the present disclosure operates. A communication link or hub is provided to direct communication between various elements of the turbine system. As shown, a communication link is a Distributed Control System (DCS) identified by the numeral 20, and provides a link to the various elements of the system. However, the operational elements of the turbine may be linked directly to each other, without the need for a DCS. Most of the turbine control is performed through the DCS 20. A turbine controller 30 communicates directly with the turbine (as shown) and with the DCS 20. In the present disclosure, information relevant to turbine operation, e.g., turbine dynamics, turbine exhaust emissions, etc. is directed through the DCS 20 to other elements of the system, such as the tuning controller 10. The tuning controller 10 is contemplated to be a stand-alone PC used to run as a programmable logical controller (PLC). In the present disclosure, information relevant to turbine operation is directed through the tuning controller 10. This relevant information is also referred to as the turbine's operational parameters, which are parameters that are measured, by way of various types and number of sensors, to indicate operational status of various aspects of the turbine. These parameters can be fed as inputs into the autotuning controller. Examples of operation parameters include combustor dynamics, turbine exhaust emissions, and tubing exhaust temperature, which is generally influenced by the overall fuel/air ratio of the turbine.

Figure 2:
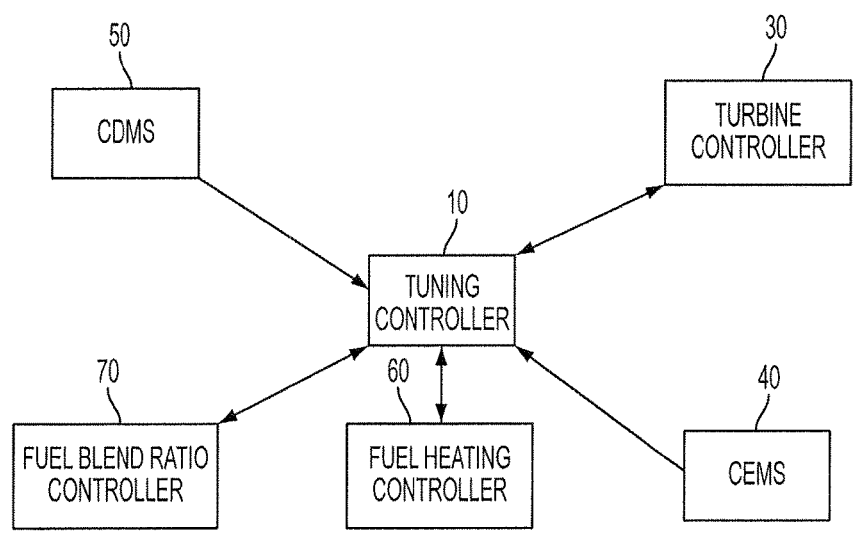
FIG. 2 shows a schematic representation of an alternate embodiment of an operational plant communication system encompassing the fuel turbine engine system, incorporating a fuel turbine tuning controller, where the tuning controller is the central communication hub.
Figure 3:
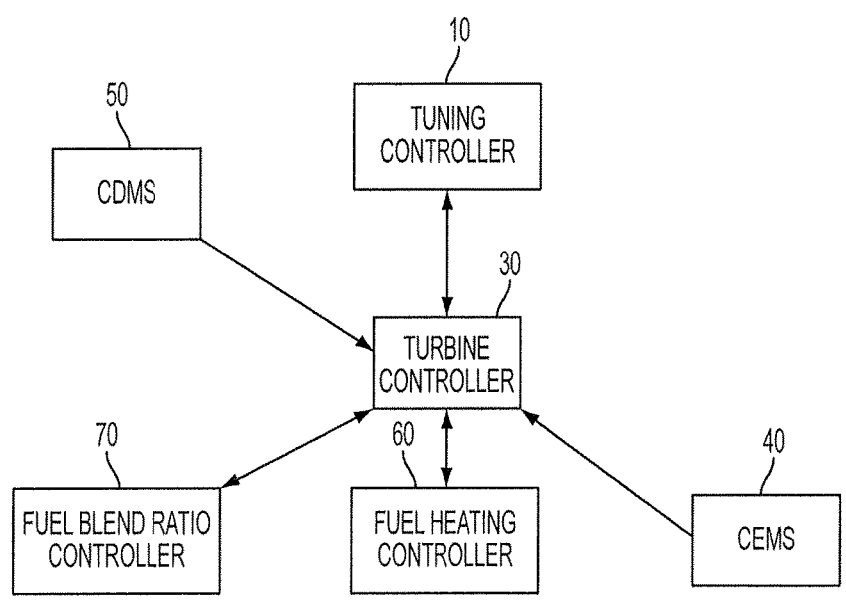
FIG. 3 shows a schematic representation of a further alternate embodiment of an operational plant communication system encompassing the fuel turbine engine system, incorporating a fuel turbine tuning controller, where the fuel turbine tuning controller is the central communication hub.

Referring now to FIGS. 1, 2, and 3, the tuning controller 10 is preferably a separate computer from the turbine controller 30 that is in constant communication with the turbine controller 30, either directly or through the DCS 20. The signals from the tuning controller 10 may be transferred to the turbine controller 30 or other controls within the system by the use of an external control device, such as a MODBUS Serial or Ethernet communication protocol port existing on or added to the system. In an alternate configuration, the tuning controller 10 may be embedded in the turbine control system should a plant configuration not include a DCS system and use the controller as a distributed control system.

The relevant operational parameters are received from sensor means associated with the turbine. For example, the turbine exhaust emission reading is taken from stack emissions by a continuous emissions monitoring system (CEMS) 40, and sent to the tuning controller 10 and/or the turbine controller 30. Combustion dynamics are sensed using a dynamic pressure sensing probe located within the combustion region of the turbine combustor. As shown, a continuous dynamics monitoring system (CDMS) 50 is provided and communicates with the DCS 20 and controller 60. The CDMS 50 preferably uses either direct mounted or wave guide connected pressure or light sensing probes to measure the combustion dynamics. Another relevant operational parameter is the fuel temperature, which is sensed at the fuel heating controller 60. The fuel temperature information is directed to the tuning controller 10 through the DCS 20 from the fuel heating controller 60. Since part of the tuning operation may include adjustment of the fuel temperature, there may be a two-way communication between the tuning controller 10 and/or turbine controller 30 from the fuel heating unit 60, via the DCS 20. The DCS 20 also communicates with a fuel blend ratio controller 70 to adjust the ratio of pipeline quality fuel to non-pipeline quality fuel (for subsequent consumption within the turbine). The system may also be used to adjust blends of other fuels for turbines that are operating on liquid fuels, such as a turbine in a marine application or distillate fired power generation application. There exists, as part of this disclosure, communication between the fuel blend ratio controller 70 and the tuning controller 10, via the DCS 20. For purposes of this disclosure, "pipeline quality" and "non-pipeline quality" fuel or fuel shall be used to refer to first and second types of fuels having different characteristics, such as price, level of refinement or other characteristics that may influence the decision to prefer one fuel over the other fuel.

FIG. 2 shows a communication diagram of an alternate embodiment of a system that is similar to FIG. 1, with the exception that the DCS 20 is removed from the communication network. In this setup, the tuning controller 10 communicates directly with all other devices/controllers (30, 40, 50, 60 and/or 70). For purposes of the present application, the tuning process will be described with the communication layout as determined in FIG. 1; however, the below-described tuning process can also be applied to the communication schematic identified in FIG. 2.

FIG. 3 shows a communication diagram of a second alternate embodiment of a system that is similar to FIG. 2, except that the DCS 20 is removed from the communication network. In this setup, the turbine controller 30 communicates directly with all over devices/controllers (10, 40, 50, 60 and/or 70). For purposes of the present application, the tuning process will be described with the communication layout as determined in FIG. 1; however, the below-described tuning process can also be applied to the communication schematic identified in FIG. 3.

Relevant operational data from the turbine may be collected at least several times per minute. This frequency of data collection allows for near real-time system tuning. Most relevant turbine operational data is collected by the tuning controller in near real-time. However, the turbine exhaust emissions data is typically received from the CEMS 40 by the tuning controller 10 with a 2 to 8 minute time lag from current operating conditions. This time lag necessitates the need for the tuning controller 10 to receive and buffer relevant information, for a similar time lag, before making operational tuning adjustments. This tuning controller 10 tuning adjustment time lag assures that all of the operational (including exhaust emissions) data is representative of a stable turbine operation before and after any adjustments are made. Once the data is deemed stable, the tuning controller 10 determines whether there is a need for adjustment of operational control elements to bring the tuning parameters into acceptable ranges. The procedure for determining whether any tuning adjustments are necessary will be described in further detail below. If no adjustment is necessary, the tuning controller 10 maintains the current tuning and waits to receive the next data set. If changes are desired, tuning commences.

In a situation where there are no tuning adjustments necessary to correct operating conditions if the turbine, and if there is sufficient margin in the key operational characteristics of the turbine (e.g. exhaust emissions and combustor dynamics), the tuning controller 10 can send a command directly to the fuel ratio controller 70 as shown in FIG. 2, or alternatively, to the fuel ratio controller 70 through the DCS 20 as shown in FIG. 1, to increase the ratio of non-pipeline quality fuel to pipeline quality fuel or alternative fuels such as distillate. As used herein, control elements or operational control elements are control inputs that can be manipulated by the tuning controller 10 to produce a change in the operational parameters of a turbine. These elements can either reside with the turbine controller 10, within the plant distributed control system (DCS), or within an external controller that controls the properties of inputs into the turbine (such as fuel temperature). Examples of operational control elements include combustor fuel splits, turbine fuel/air ratio, and inlet temperature.

All determinations of the need for turbine tuning are performed within the tuning controller 10. The tuning operation is started based on an indicator, such as an "alarm" condition that is created by receipt of operational parameter data outside of acceptable limits of preset operational criteria. In order for the tuning operation to be initiated, the alarm—and thus the operational parameter data anomaly—must continue for a predetermined period of time.

One example of a tuning adjustment is the variation of the fuel nozzle pressure ratio to adjust combustion dynamics. With the requirement of higher firing temperatures to achieve greater flame temperatures and efficiency, turbine combustors must release more energy in a given combustor volume. Better exhaust emissions are often achieved by increasing the mixing rate of fuel and air upstream of the combustion reaction zone. The increased mixing rate is often achieved by increasing the pressure drop at the fuel nozzle discharge. As the mixing rate increases in combustors, the turbulence generated by combustion often leads to noise within the combustor and may lead to the generation of acoustic waves. Typically, acoustic waves are caused when the sound waves of the combustion flames are coupled with the acoustic characteristics of the combustor volume or the fuel system itself.

Acoustic waves may affect the internal pressure in the chamber. Where combustor pressure inside a combustion chamber, near a fuel nozzle rises, the rate of fuel flowing through the nozzle and the accompanying pressure drop decreases. Alternatively, a decrease in pressure near the nozzle will cause an increase in fuel flow. In cases where a fuel nozzle pressure drop allows fuel flow oscillation, a combustor may experience amplified pressure oscillations. To combat the pressure oscillations within the combustor, combustion dynamics are monitored and the fuel air ratio and fuel nozzle pressure ratio may be modified to reduce or eliminate unwanted variations in combustor pressure, thereby curing an alarm situation or bringing the combustion system back to an acceptable level of combustion dynamics.

Figure 4:
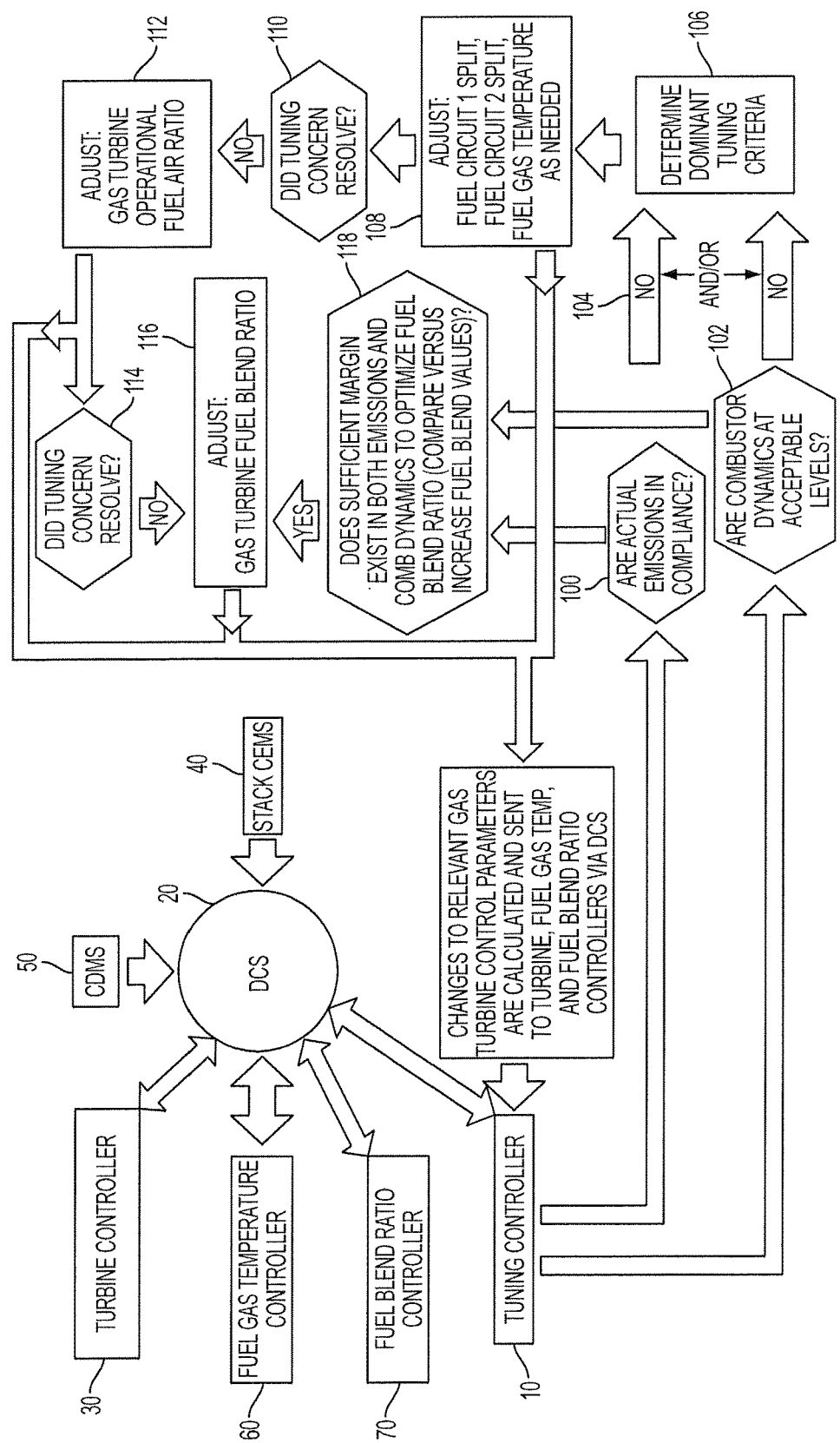
FIG. 4 shows an exemplary embodiment of a functional flow chart for the operation of a tuning controller according to the present disclosure.

As shown in FIG. 4, the data received from the CDMS 50, CEMS 40, fuel temperature controller 60 and other relevant turbine operating parameters from the turbine controller 30 may be directed through the DCS 20 to the tuning controller 10. These input values are then compared to standard or target operational data for the turbine. The stored operational standards are based, at least in part, on the operational priority settings for the turbine in the form of tuning alarm levels, as will be described in more detail below. The priority settings are defined by user selected inputs on the main user interface 12 of the tuning controller 10, as shown graphically in FIG. 5. Based on the priority settings, a series of adjustments are made to the operation of the turbine by the turbine controller 10 connected through the DCS 20. The adjustments are directed to the control means, including the fuel heating unit 60, fuel blend ratio controller 70, and various other operational elements of the turbine controller 30.

In addition to adjusting the tuning parameters described above, the turbine controller will also determine if there is sufficient margin amongst the operational standards to adjust the fuel blend ratio. Typically, as described in further detail below, the amount of non-pipeline quality fuel will be increased if the system is found to be well within the tuning limits, and the amount of pipeline quality fuel will be increased if tuning alarms are activated.

Figure 5:
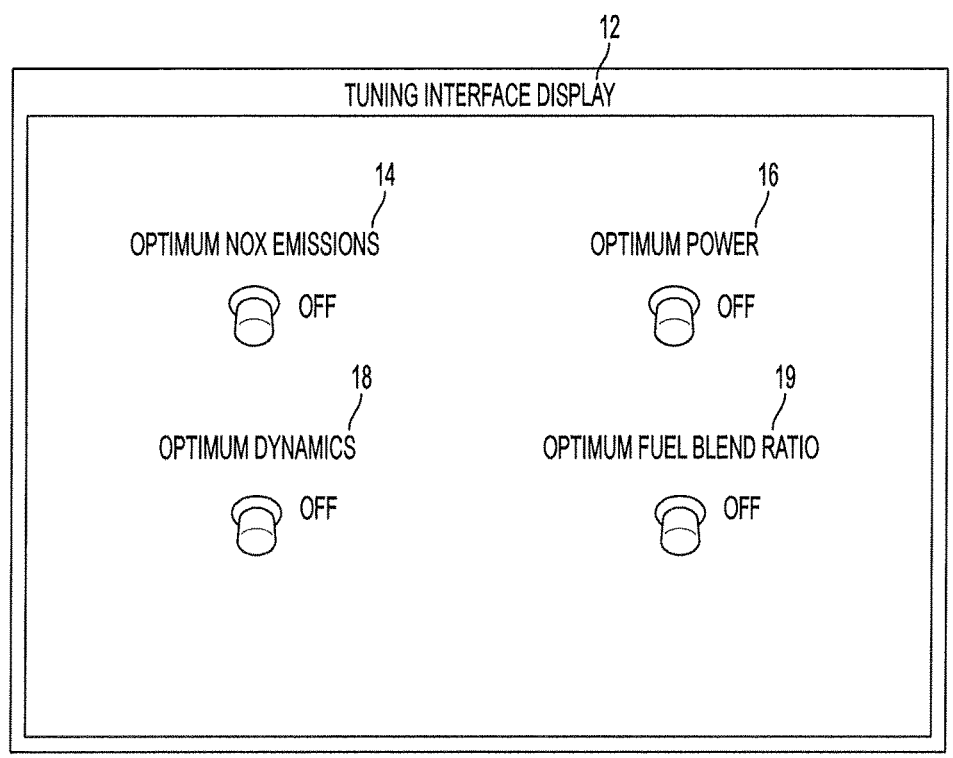
FIG. 5 shows an exemplary embodiment of a user interface display for selecting the optimization mode within the present disclosure.

The interface display 12 shown in FIG. 5 is the main user interface display that end users will operate to determine tuning alarm levels. The interface 12 is comprised of switches (each having an On/Off indication). These switches allow the user to specify the desired tuning priorities for the operation of the turbine. In the embodiment shown, the switched operational priorities include optimum NOx emissions 14, optimum power 16, optimum combustor dynamics 18, and optimum fuel blend ratio 19. Each of these switches is set by the user to adjust the preferred operation of the turbine. Switching the switches from "Off" to "On" operates to change the alarm limits for each parameter. Within the tuning controller 10 are functions that modify operations within the turbine, based on priorities set by the switches. The priorities may also be governed logic implemented thorough hardware configured to perform the necessary logic operations in addition to user selected priorities. For example, in the embodiment described here, if both the optimum NOx emissions switch 14 and the optimum power switch 16 are set to "On", the controller 10 will run in the optimum NOx mode, not optimum power. Thus, to run in optimum power mode, the optimum NOx emissions switch 14 must be "Off". In the embodiment shown, optimum power 16 may only be selected if optimum NOx 14 is in the off position. Optimum dynamics 18 can be selected at any time. The optimum fuel blend ratio 19 switch may be "On" when any of the switches are "On" and will overlay other operational parameters. It is explicitly noted that other User-Interface Toggle Switches (not shown) may be used, including parameters such as Optimum Heat Rate, Optimum CO emissions, Optimum Heat Recovery Steam Generator (HRSG) Life, Optimal Gas Turbine Turndown Capability, etc.

Figure 6:
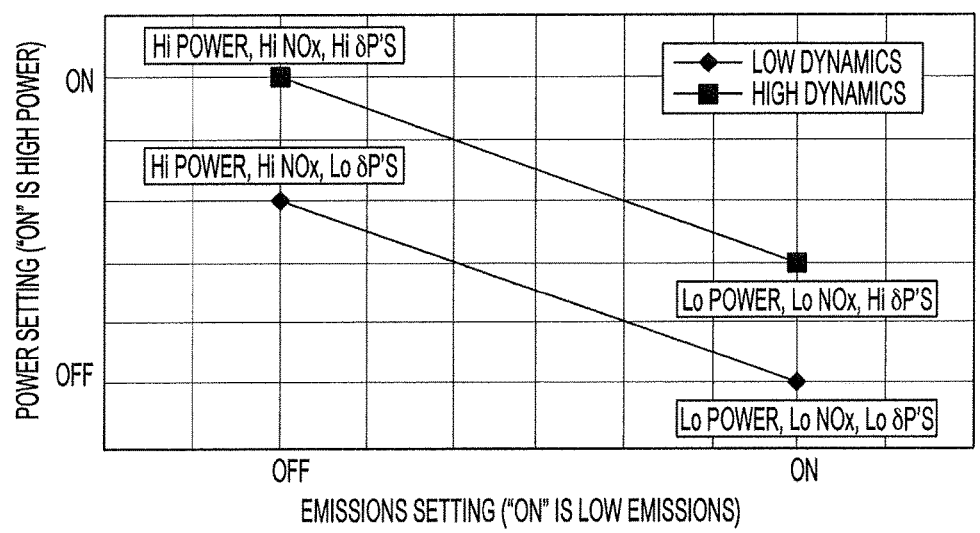
FIG. 6 shows an exemplary schematic of the inter-relationship of various optimization mode settings.

FIG. 6 shows a graphical representation of the interrelationship of the interface display switches. As shown, switching one parameter "On" will alter the alarm limits to a different level than their "Off" level. In the example shown in FIG. 6, the alarm limits are shown with both Optimum NOx and optimum power in the "On" position and in the "Off" position. These points on the graph are then modified by the selection of optimum dynamics (represented throughout by the symbol 6) in either the "On" or "Off" position. The points shown on the graph of FIG. 6 represent an exemplary set of limits for dynamics, based on the user's selected operational priorities.

Activating the Optimum Fuel Blend Ratio switch 19 of FIG. 4 will not affect the overall tuning parameters of the controller. Rather, activating the Optimum Fuel Blend Ratio switch 19 will overlay as second set of allowable limits upon the limits imparted by the other switches 14, 16, 18. The second set of limits is based on the existing limits set by Optimum NOx, Power and Dynamics, but provides for an operational envelope within these limits. If the turbine is operating within the limits set by activating the Optimum Fuel Blend Ratio switch 19, the controller 10 will adjust the fuel blend ration to increase the amount of non-pipeline quality fuel. Conversely, if the turbine is operating outside of the limits set by activating the Optimum Fuel Blend Ratio switch 19, the controller will adjust the fuel blend ratio to increase the amount of pipeline quality fuel. Adjustments to the fuel blend ratio are done during the normal tuning progression described with respect to FIG. 4.

FIG. 4, shows a representation of the logical flow of the determinations and calculations made within the tuning controller 10. The tuning controller 10 receives the actual operating parameters of the turbine through the turbine controller 30, combustor dynamics through the CDMS 50, and the turbine exhaust emissions through the CEMS 40. This sensor data is directed to the tuning controller 10, either directly from the elements 40, 50 and 60 mentioned above, or through the DCS 20. The received sensor data is compared to stored operational standards to determine if the turbine operation is conforming to the desired settings. The operational standards are stored in the tuning controller 10 in the form of alarm levels, where normal operation of the turbine will return operational data for each parameter that is between the high and low alarm levels set for that parameter. The alarm levels for the operational standards are based on the preset operational priorities of the turbine, defined by the user switches 14, 16, 18, 19 on the main user interface display 12 of the tuning controller 10, as discussed above with respect to FIG. 5.

Based on the preset operational priorities, a hard-coded hierarchical Boolean logic approach that is coded into the tuning controller 10 determines the dominant tuning criteria based on operational priorities. From this logical selection, the tuning controller 10 implements a fixed incremental adjustment value for changing an operational parameter of the turbine within a maximum range of adjustment (e.g., high and low values). The tuning changes are made in a consistent, pre-determined direction over a pre-determined increment of time and are dependent on the dominant tuning criteria at the time. It is contemplated that no instant formulaic or functional calculations are made to determine the direction, magnitude and spacing of tuning adjustments; rather, the magnitude of the incremental adjustments, the direction of the adjustments, the time span between adjustments, and the maximum range for the adjustments for each control element are stored in the tuning controller 10 and selected based on the alarm returned and user's operational priorities. This criteria is preferably stored in the tuning controller 10 as tuning control constrains and may be modified from time to time as desired by the user.

As shown in FIG. 4, the tuning controller 10 determines whether the emissions are in compliance 100 and whether the combustor dynamics are at acceptable levels 102 by comparing the operating parameters received from the CDMS 50 and CEMS 40 respectively, to the operational standards and alarm levels saved in the tuning controller 10 as discussed above. If both are in compliance with the set operational standards, no further corrective action is taken and the tuning controller 10 waits for the next data set from the CEMS 40 or the CDMS 50, or for other operational data from the turbine controller 30. If the data received from the CEMS 40 or the CDMS 50 is non-conforming with the operational standards, i.e. above or below alarm levels as is the case with step 104 of FIG. 2, the tuning operation moves to the next tuning step of first determining the dominant tuning concern 106. The logical adjustment of turbine operation is defined by the dominant tuning criteria 106, which is based, at least in part, on the preset operational priorities set within the user interface 12, as will be discussed below with respect to FIG. 10.

Once the dominant tuning concern is determined, the tuning controller 10 will attempt to correct the operational parameter to ensure that the levels are within the operational standards stored in the tuning controller 10. In a preferred operation, to correct a tuning issue, the tuning controller 10 will first attempt to incrementally change the turbine combustor fuel splits 108. For a machine fueled with liquid fuel, fuel splits are substituted by atomizing air pressure regulation and fuel flow. The fuel split determines the distribution of the fuel flow to the fuel nozzles in each combustor. If adjusting the fuel splits 108 does not resolve the tuning issue and place the operational parameters data back into conformance with the operational standards, a further adjustment to an operational control element is performed. In the example shown, the next incremental adjustment may be a change of the fuel temperature set point. In this adjustment step, the tuning controller 10 sends a modified fuel inlet temperature signal to the DCS 20, which is directed to the fuel heating unit 60.

After the incremental steps are taken in step 108, a check at step 110, is made to see if modification of the combustor fuel splits and/or fuel inlet temperature resolved the tuning issue. If further tuning corrections are needed, the tuning controller 10 will then alter the overall fuel/air ratio 111 This approach makes changes to the turbine thermal cycle utilizing fixed incremental changes over pre-determined amounts of time. This step of modifying the fuel/air ration 112 is intended to adjust the exhaust temperature (up or down) by adjusting the air to fuel ratio in accordance with predetermined, standard control curves for the turbine operation, which are maintained within the memory of the tuning controller 10.

If changes made to the turbine's overall fuel/air ratio do not resolve the tuning issue 114, the tuning controller 10 will adjust the fuel blend ratio 116. Typically, if an alarm condition requires tuning, the amount of pipeline quality fuel will be increased incrementally in relation to the amount of non-pipeline quality fuel.

Additionally, if there is sufficient margin 118 in the turbine's key operational parameters and the Optimum Fuel Blend Ratio toggle switch 19 is "On", the tuning controller 10 will send a command to the fuel blend ratio controller 70 to increase the ratio of non-pipeline quality fuel to pipeline quality fuel. The margin 118 for determining whether a fuel blend adjustment may be made, or is necessary, is determined based on the other operational parameters of the system, such as NOx, dynamics or power. In a preferred embodiment, the margin 118 represents a buffer or second set of limits within the operational envelope that is determined for other operational parameters of the system, such as NOx, dynamics or power. Thus, if the operating state of the system is within this second set of limits, the fuel blend ratio controller 70 will adjust the fuel blend ratio 116 to increase the amount of non-pipeline quality fuel. Conversely, if the system is outside of allowable limits, the ratio of pipeline quality fuel will be increased. In a situation where non-pipeline quality fuel is being fed to the turbine and tuning event occurs due to an alarm such as from NOx, high or low dynamics or power, the ratio of non-pipeline quality fuel may be lowered, or other parameters may be adjusted, depending on the type of alarm and user's operational preferences.

In the present disclosure, the normal mode of communication provides tuning changes utilizing control signals intended for a given control element that are directed by the tuning controller 10 that are fed to the turbine controller 30 fuel temperature controller 60, and/or fuel blend ratio controller 70 through the DCS 20. However, the control signals can also be communicated directly to the turbine controller 30, etc. without use of the DCS 20. These adjustments are implemented directly within the various controller means within the system or through the turbine controller 30. When the operational data is returned to the desired operational standards, the tuning settings are held in place by the tuning controller 10 pending an alarm resulting from non-conforming data received from the sensor means 40, 50, 60.

The incremental adjustments sent from the tuning controller 10 to the turbine controller 30 or the associated controller means (30, 60, 70) are preferably fixed in magnitude. Thus, the adjustments are not recalculated with new data or optimized to a modeled value or target. The adjustments are part of an "open loop," which is bounded by the preselected operational boundaries. Once started, the adjustments move incrementally to the preset maximum or maximum within a specified range, unless an interim adjustment places the operation data into conformance with the operational standards. Under most circumstances, when the full incremental range of available adjustments for one operational control element is completed, the tuning controller 10 moves on to the next operational control element, which is defined by the preset operational priorities. The logic of the tuning controller 10 drives the adjustment of operational control elements on a step-by-step basis, where the incremental steps of adjustment for each control element are stored within the memory of the tuning controller 10.

The tuning controller 10 preferably addresses one operational control element at a time. For example, the dominant tuning criteria 106 dictates the first adjustment to be made. The order of which operational control elements are to be adjusted is not fixed and will vary based on operating parameters and inputs such as the dominant tuning criteria 106. In the preferred example discussed above, the fuel distribution/split control element is first adjusted in step 108. As indicated in FIG. 4, during this step, the fuel split of fuel circuit 1—the center nozzle in the combustor—is first addressed, followed by the split for fuel circuit 2—the outer nozzles in the combustor. This system can also be applicable to other combustion turbine configurations that do not include a center nozzle in a can annular configuration, but do contain a number of fuel circuits. Similarly, this system can be applied to an annular combustion configuration with more than one fuel circuit or a liquid fuel system with a single fuel circuit and the ability to vary the fuel to air ratio, It should be noted that the application of fuel circuits 1 and 2 is general in nature and can be applied to the specific hardware configuration within any particular combustion system. Therefore, this tuning approach is applicable to any combustion system with multiple fuel sources, regardless if it has only one fuel split, two fuel splits, more than two fuel splits, or no fuel splits. If the combustion system has only one useful fuel split, then this second tuning step or adjusting fuel circuit 2 is left within the tuning algorithm; but, abandoned in-place. If the combustion system has more than 2 fuel splits, then the 2 most effective fuel split "knobs" are utilized. If the combustion system has no fuel circuits but does have multiple fuel sources where the amount of fuel from each source can be controlled The fuel gas inlet temperature adjustment generally follows the fuel split adjustments when needed. Within each step, there is an incremental adjustment, followed by a time lag to permit the adjusted turbine operation to stabilize. After the time lag, if the current operational data analyzed by the tuning controller 10 indicates that turbine operation still remains outside of the operational standards, the next incremental adjustment within the step is made. This pattern repeats for each step. Under most circumstances, only when one adjustment step is completed does the tuning controller move onto the next operational control elements.

The inlet temperature adjustment generally follows the fuel split adjustments when needed. Within each step, there is an incremental adjustment, followed by a time lag to permit the adjusted turbine operation to stabilize. After the time lag, if the current operational data analyzed by the tuning controller 10 indicates that turbine operation still remains outside of the operational standards, the next incremental adjustment is made. This pattern repeats for each step. Under most circumstances, only when one adjustment step is completed does the tuning controller move onto the next operational control element. As mentioned above, there exists an over-riding loop whereby the tuning controller 10 will directly increase the non-pipeline quality fuel blend ratio (through the fuel blend ratio controller 70) if key turbine operational characteristics possess ample operational margin (against alarm conditions) 118. The control methodology of this over-riding control loop is identical to that mentioned above for fuel splits and turbine fuel air ratio—a change is made in a pre-defined direction, a pre-defined amount, in a pre-defined amount of time. Analogously, a liquid fueled machine can adjust the ratio of two fuel streams with differing thermophysical properties or optimize for one fuel source or a lower or higher fuel source for a prolonged operating period.

The tuning controller 10 preferably controls combustion operation to maintain proper tuning in variable conditions of ambient temperature, humidity and pressure, all of which vary over time and have a significant effect on turbine operation. The tuning controller 10 may also maintain the tuning of the turbine during variation in fuel composition. Variation in fuel composition may cause a change in the heat release, which can lead to unacceptable emissions, unstable combustion, or even blow out. In this event, the tuning controller 10 will adjust fuel composition entering the turbine indirectly through changes in the fuel blend ratio 116. The tuning controller may also serve to supplement this adjustment in fuel composition to tune operational control elements (such as fuel distribution, fuel inlet temperature, and/or turbine fuel/air ratio) to address the effects on combustion output and discharge. In each case, if the Optimum Fuel Blend Ratio switch 19 is "On" and the variation of conditions leads the operation of the turbine to be within the operational limits, the amount of non-pipeline quality fuel will be increased in relation to the amount of pipeline quality fuel. Conversely, if variations in operational conditions leads to the turbine operating outside of the preset limits, or an alarm condition occurring, the ratio of pipeline quality fuel will be increased.

In other tuning scenarios, an alternate order for the adjustments is contemplated. For example, if the dominant operational priority is optimum NOx emissions (such as selected using switch 14 of FIG. 2), the fuel temperature adjustment may be skipped, going directly to the operational control curves to adjust fuel/air ratio. If, however, dynamics is the operational priority (and the optimum NOx emission switch 14 is "Off"), the incremental fuel temperature adjustment may be performed before going to the operational control curves. Alternatively, the step of making adjustments to control elements in accordance with the operational fuel air ratio control curves may be turned off completely, based on a user's priorities.

Figure 7:
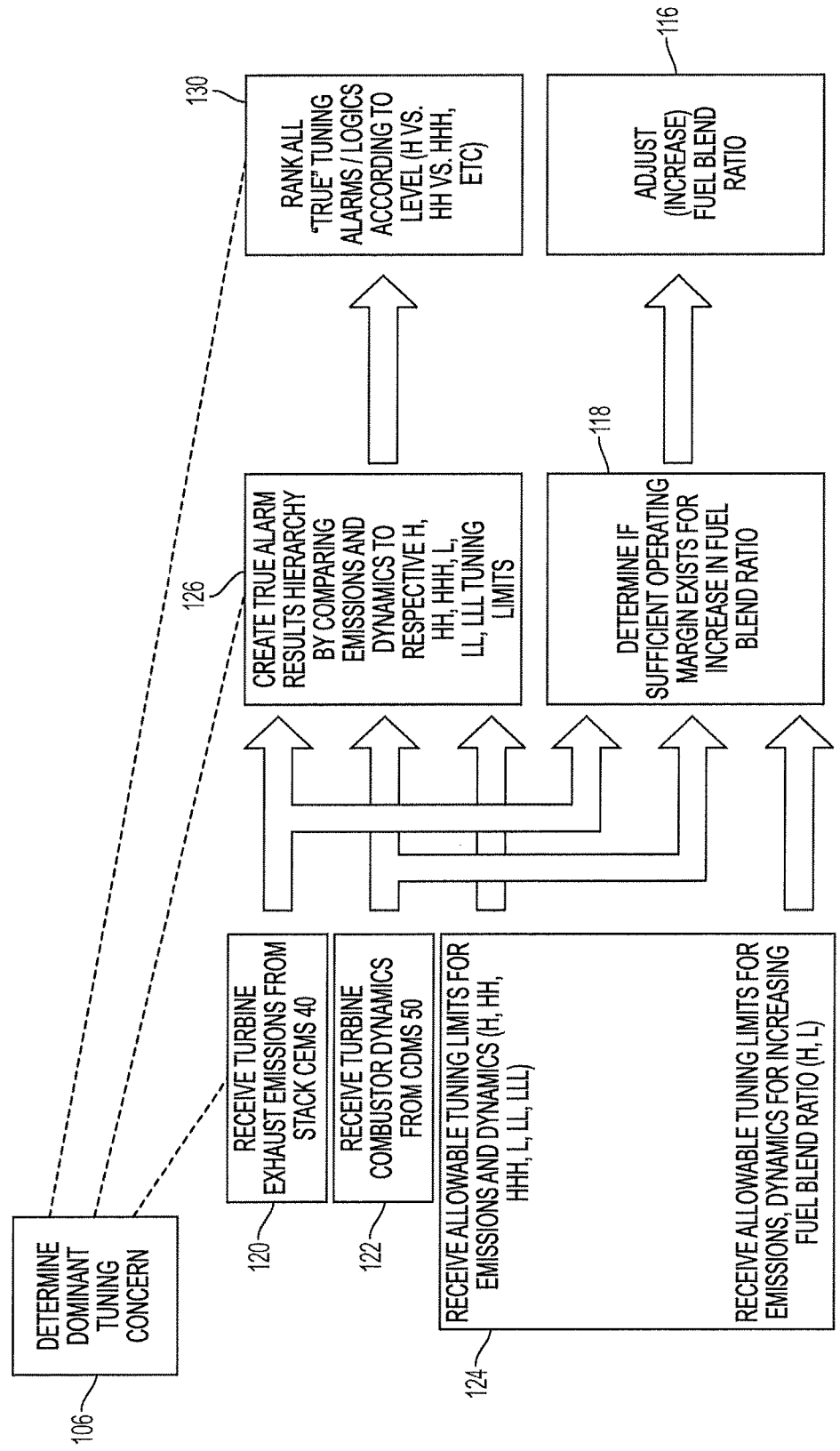
FIG. 7 shows an exemplary overview schematic of the process steps utilized to determine the alarm signals triggered according to the present disclosure.

FIG. 7 provides a schematic that details the framework for determining the dominant tuning concern 106, as included in FIG. 4. Future steps will be described below with respect to FIG. 8. First, relevant emissions parameters 120 and combustor dynamics 122 are received by the tuning controller 10 from the CEMS 40 and CDMS 50, as detailed above. The relevant emissions parameters 120 and combustor dynamics 122 are then compared to allowable tuning limits 124 that are also provided to the tuning controller 10. The allowable tuning limits are in the form of preset ranges that may be adjusted using the tuning interface 12 of FIG. 3 and determined according to the logic set forth below with respect to FIGS. 6 and 7. The output of this comparison is a series of "True" alarms 126 of various tuning concerns, where an alarm condition is indicated if the sensed operational data 120, 122 is above or below a given alarm range set forth in the tuning limits 124. In the event that Optimum Fuel Blend Ratio switch 19 is "On," the allowable tuning limits for emissions, dynamics and power will also be provided as part of step 124. Likewise, a "True" condition will exist if sufficient operating margin exists for increasing the fuel blend ratio, as shown in step 118. The fuel blend ratio will be adjusted in step 116 as part of the tuning process shown in FIG. 4.

Alarm conditions may have more than one level or tier. For example, there may be varying degrees of severity of an alarm, such as: high "H"; high-high "HH"; high-high-high "HHH" and low "L"; low-low "L"; low-low-low "LLL". The "True" logical alarms 126 are subsequently ranked according to their level of importance (e.g. high-high "HH" alarms are more important than high "H" alarms, etc.) in step 130. If more than one tuning concern shares the same level, the tuning concerns will then be ranked according to the user preferences as set forth below with respect to FIG. 10. If only one "True" alarm emerges, this will be selected and used as the dominant tuning concern 106 to initiate the tuning process as set forth in FIG. 2. However, the results of the process of FIG. 7, namely the ranked "True" alarms 130, will be processed through user determined criteria, as shown in FIG. 8, before a dominant tuning concern 106 is confirmed.

Figure 8:
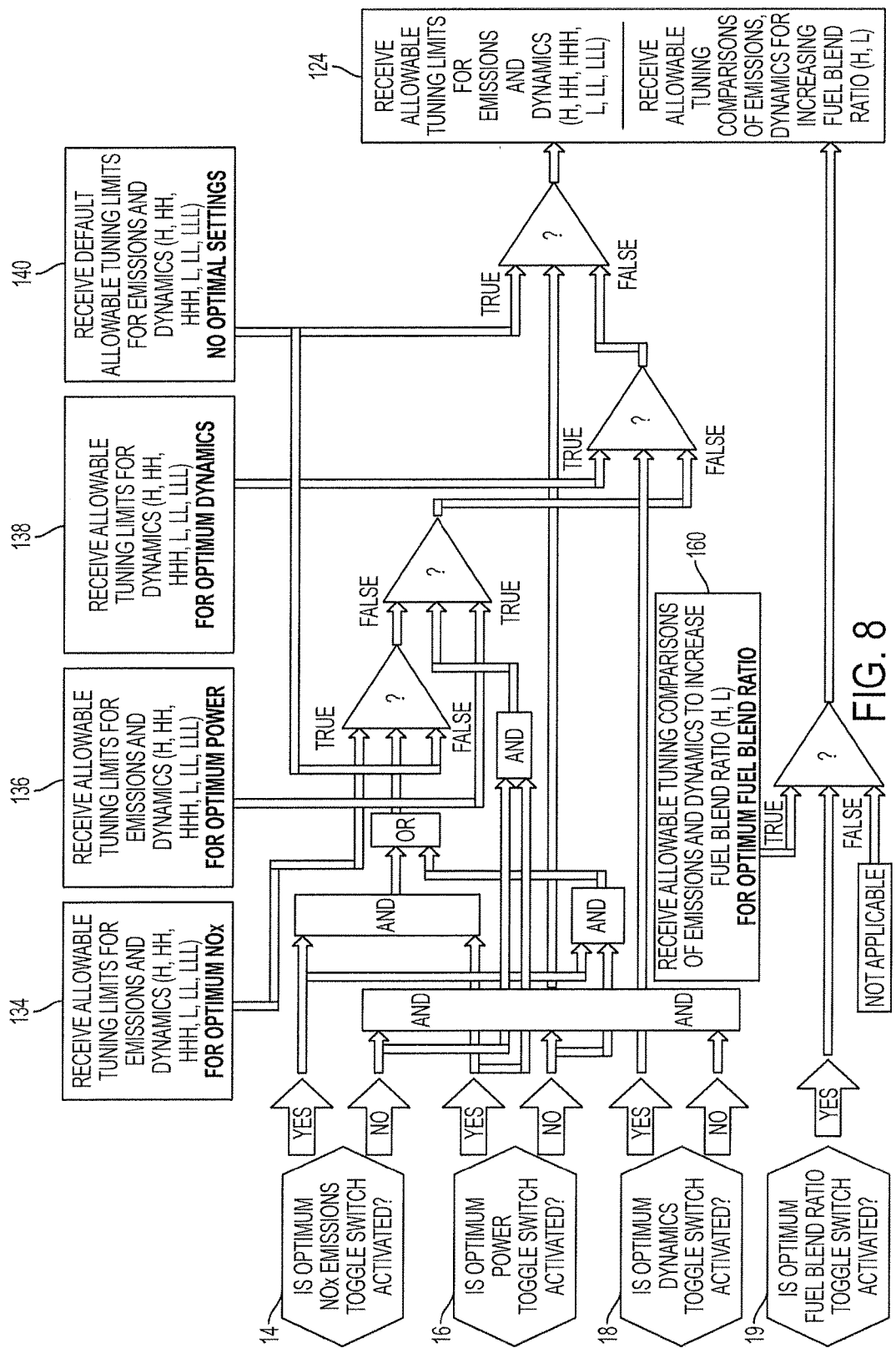
FIG. 8 shows an exemplary process overview of the steps to determine allowable turbine tuning parameters.

In FIG. 8, a flow chart is provided to explain how the allowable tuning limits 124 are determined. Once determined, the tuning limits 124 are compared to the operational data 120, 122 as set forth above and shown in FIG. 7. First, the User Interface Toggle Switches 14, 16, 18, 19 corresponding to those in the interface display 12 of FIG. 5, are compared against each other, utilizing an internal hierarchy to allow passage of the alarm constraints relative to the most significant toggle switch. Thus, depending on which switches are in the "On" position, different tuning limits will be included in the allowable tuning limits 124. Each of Optimum NOx, Optimum Power and Optimum Dynamics has a collection of preset limits (denoted by the numerals 134, 136 and 138 in FIG. 8), depending on whether the corresponding toggle switch 14, 16, 18, 19 is in the "On" of "Off" position. There is also an internal set of default limits 140 to be used when none of the toggle switches are in the "On" position.

The internal hierarchy will determine which tuning limits shall take precedence in the event that competing toggle switches 14, 16 18, or 19 are in the "On" position. In the present example, the hierarchy ranks Optimum NOx above Optimum Power. Optimum Dynamics may be selected at any time and will simply alter the tuning limits of the other selections given, such as is shown in FIG. 4. If Optimum NOx 14 and Optimum Power 16 are both in the "On" position, the tuning limits for Optimum NOx 134 will be used. Additionally, the tuning limits for Optimum Dynamics 138 are utilized if this toggle switch 18 is activated. If no User Interface Toggle Switches 14, 16, 18, 19 are active, default tuning limits 140 are provided as the allowable tuning limits 124. All of the tuning limits 134, 136, 138 and 140 that may be used to construct the allowable tuning limits for the tuning controller 10 may be developed by the end user and programmers and are then preferably hard coded into the tuning controller 10 for a given application. The methodology outlined in FIG. 7 is meant to provide an exemplary framework for incorporation of a number of different User Interface Toggle Switches, such as those options set forth above with respect to FIG. 5, whereby only a subset are specifically outlined in this disclosure.

The allowable tuning limits for determining whether an increase in fuel blend ratio is allowable will be based on the selected tuning limits based on other operational parameters of the system, such as NOx, dynamics or power. Thus, depending on what the limits are for the other parameters, fuel blend tuning limits 160 will be established and compared to the operating conditions of the turbine to determine if a fuel blend ratio adjustment is called for.

Figure 9:
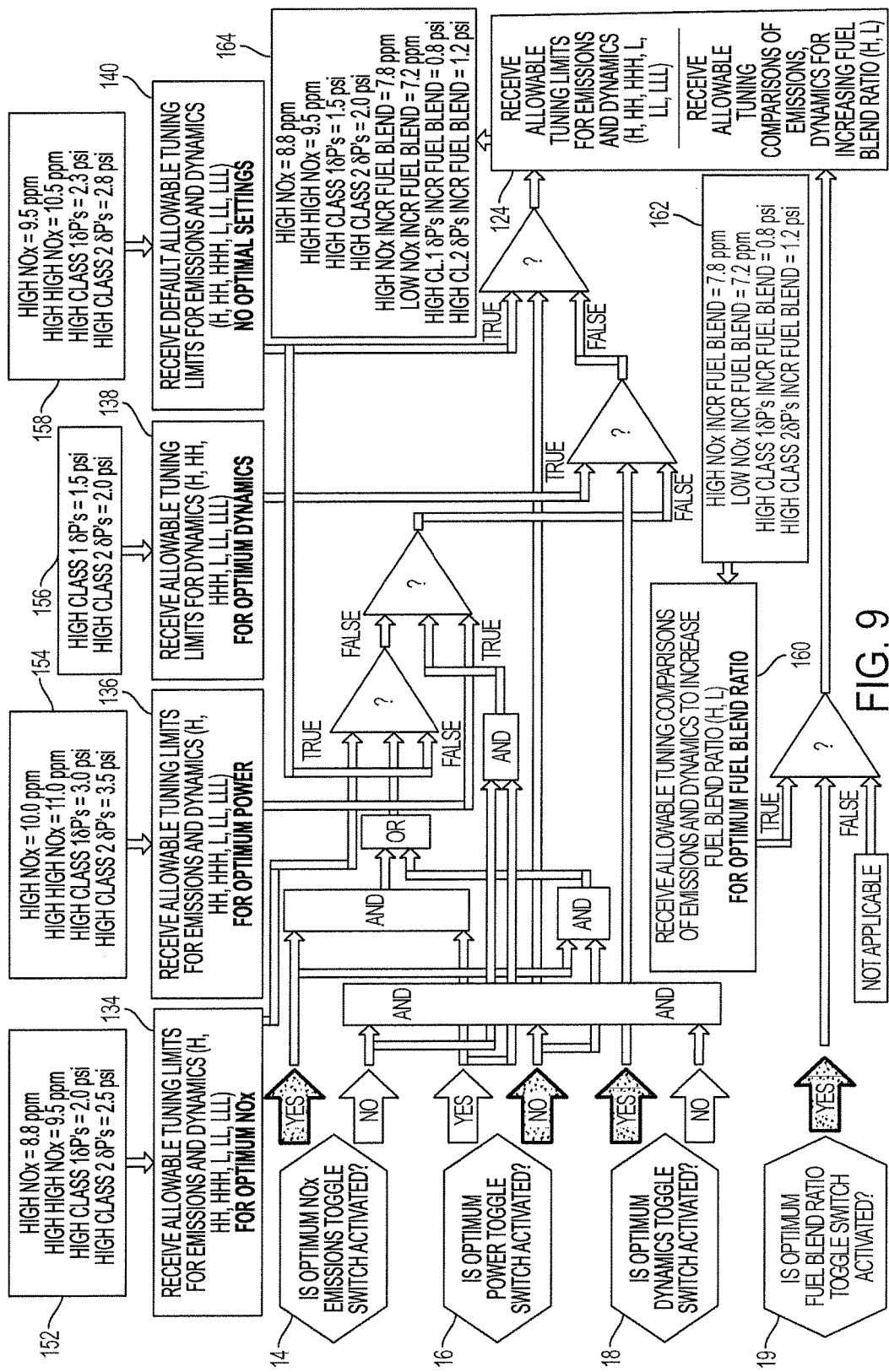
FIG. 9 shows a further detailed exemplary process according to the steps shown in FIG. 8.

FIG. 9 shows a specific example of the flow chart of FIG. 7 is given for the determination of a subset of the system's allowable tuning limits. In this example, the tuning limits for High NOx, High High NOx, High Class 1 SP's, High Class 2 6P's will be determined based on preset tuning limits and the user's preferences. The various exemplary tuning limits are provided for Optimum NOx 134, Optimum Power 136, Optimum Dynamics 138, and No Optimal Settings 140 are given corresponding numerical values (shown respectively in blocks 152, 154, 156 and 158). The corresponding numerical values given for each criterion vary, such that the allowable limits 124 will be different depending on which toggle switches 14, 16 18, or 19 are selected. By way of example, the Optimum NOx 134, 152 and Optimum Power 136, 154 give limits for NOx, but also provide limits for Dynamics that are to be used in the event that Optimum Dynamics 138, 156 is not selected. However, in the event that the Optimum Dynamics toggle 18 is selected, the Class 1 SP's and Class 2 SP's values provided, therefore 156 shall be used instead of the values listed with respect to Optimum NOx 134, 152 and Optimum Power 136, 154.

As described above with respect to FIG. 8, the fuel blend ratio limits 160 are determined based on the other operational parameters of the system, such as NOx, dynamics or power. Here, the specific limits for determining whether an increase in the ratio of non-pipeline quality fuel are set forth in block 162. The limits for High and Low NOx, are based on the other limits set forth as the result of the optimum NOx and Dynamics switches 14, 16 being "On." Thus the fuel blend limits shown at 162 are within the operational envelope determined by the other operational parameters of the system.

In this particular example, the toggle switches for Optimum NOx 14 and Optimum Dynamics 18 are selected, with the switch for Optimum Power 16 left in the "Off" position. Thus, the values from Optimum NOx for High NOx and High High NOx 152 are provided. Also, because Optimum Dynamics 18 is also selected, the Dynamics values for High Class 1 OP's and High Class 2 6P's 138, 156 replace those OP's values provided with respect to Optimum NOx 134, 152. As a result, the allowable tuning limits 124 are provided as shown in block 164. These allowable tuning limits 124 correspond to those used in FIG. 4, as described above, to determine whether information from the CEMS 40 and CDMS 50 is in an alarm state or operating normally.

Figure 10:
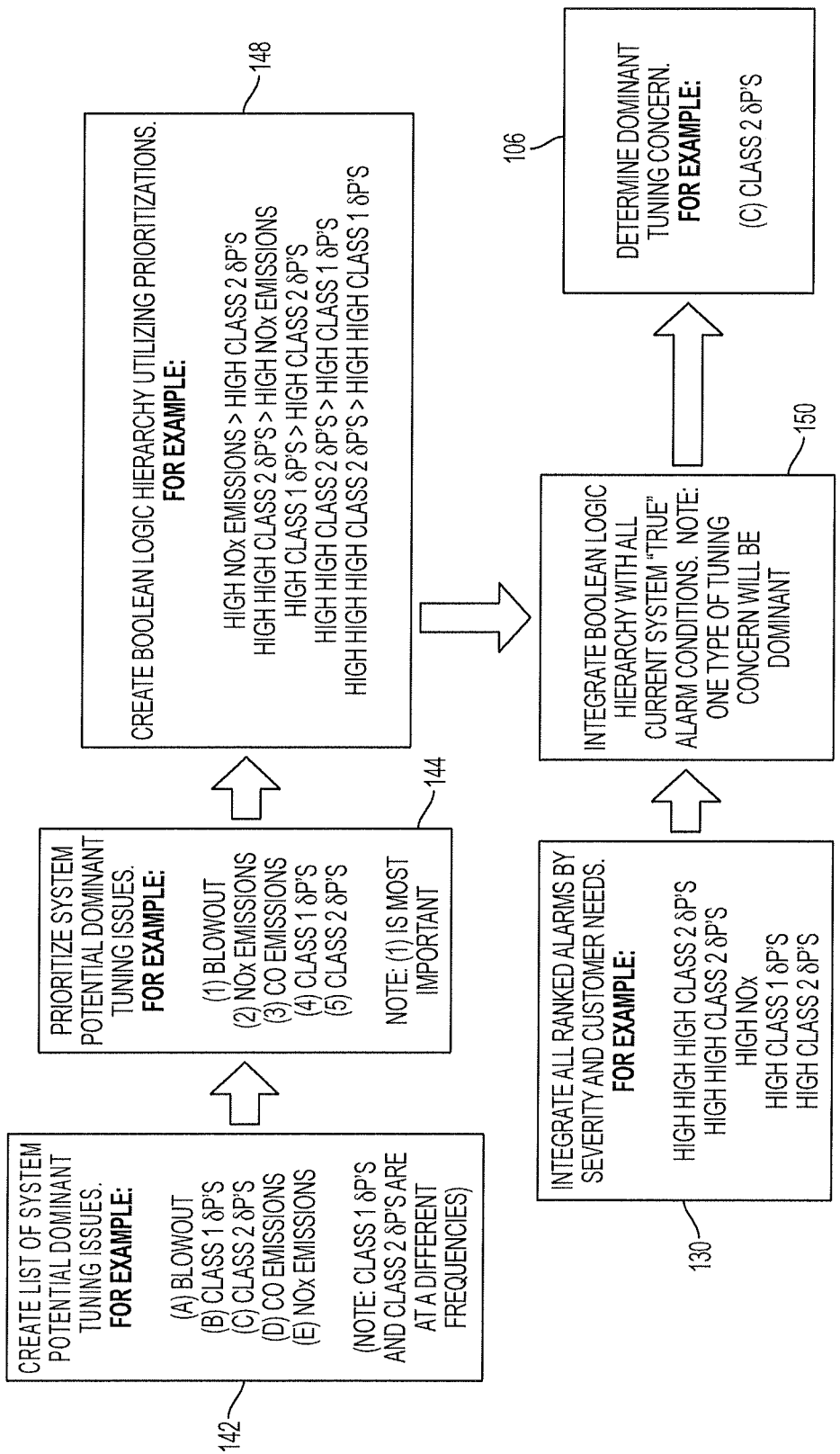
FIG. 10 shows a detailed exemplary schematic of steps utilized to determine the dominant tuning concern according to the present disclosure.

FIG. 10, shows a schematic for the process of incorporating a user's priorities and the "True" alarm conditions received for determining the dominant tuning concern 106. It is this tuning concern 106 which dictates all turbine operational changes the turbine controller 10 performs, as shown in FIG. 4.

First, a determination is made of all potential dominant tuning issues 142. These include, but are not limited to: combustor blowout, CO emissions, NOx emissions, Class 1 combustor dynamics (Class 1 OP's), and Class 2 combustor dynamics (Class 2 OP's). The list of potential dominant tuning issues 142 is determined by the user and programmer and may be based on a number of factors or operational criteria. By way of example, Class 1 and Class 2 combustor dynamics 6P's refer to combustion dynamics occurring over specific ranges of acoustic frequencies, whereby the range of frequencies is different between Classes 1 and 1 Indeed, many combustion systems can possess different acoustic resonant frequencies corresponding to Class 1 and Class 2, and variations in these 2 dynamics classes may be mitigated utilizing different turbine operational parameter changes for each different turbine and/or combustor arrangement. It should also be noted that certain combustion systems may have none, 1, 2, or greater than 2 different "classes" (frequency ranges) of combustor dynamics which can be tuned. This disclosure utilizes a system whereby 2 different combustor dynamics classes are mentioned. However, it is fully intended that this disclosure can be broadly applied to any number of distinct dynamics frequency classes (from 0 to greater than 2).

After determination of the potential dominant tuning issues 142, these issues are ranked in order of significance 144 according to the end user's needs as well as the detrimental effects that each tuning concern can have on the environment and/or turbine performance. The relative importance of each potential dominant tuning concern can be different with each end user, and for each combustor arrangement. For example, some combustion systems will demonstrate an extreme sensitivity to combustor dynamics, such that normal daily operational parameter variations can cause a normally benign dynamics tuning concern to become catastrophic in a very short amount of time. In this case, one or both of the dominant dynamics tuning concerns (Class 1 and Class 2) may be elevated to Priority 1 (Most Important). By way of example in FIG. 7, combustor blowout is listed as the most important Dominant Tuning Concern 144. This ranking is used to determine the dominant tuning concern in the event that there are multiple alarms with equal levels of severity. This ranking of Dominant Tuning Concerns 144, from most to least important, provides the overall framework where the specific Boolean Logic Hierarchy 148 is created, For example, assuming Class 1 and Class 2 6P's combustor dynamics obey monotonic behavior relative to perturbations in system operational parameters, a High-High "HH" Class 2 OP's alarm may be more significant than High "H" Class 1 OP's alarm. Additionally, in the example given in FIG. 8 for the Boolean Logic Hierarchy 148, High "H" NOx emissions is more significant than High "H" Class 2 dynamics. This means that if both High "H" NOx and High "H" Class 2 dynamics are both "in alarm" (Logic=True), in the absence of other alarms being "True", the autotuning system will tune for High "H" NOx because it is the dominant tuning concern. Finally, it can be seen that Blowout is ranked above NOx Emissions and both are ranked above Class 1 OP's. Thus, if there were high "H" alarms returned for all three categories, Blowout would be the dominant tuning concern, followed by NOx Emissions and then Class 1 OP's. This Boolean Logic Hierarchy 148 will be what is compared to the "True" alarms 130 returned by comparing the allowable tuning limits 124 to the operational data 120, 122 as set forth above with respect to FIG. 5.

All "True" tuning alarms 130 are provided as ranked by severity (e.g. HHH above HH, etc.). The "True" tuning alarms 130 are then compared with the hard-coded Boolean Logic Hierarchy 148, in step 150 to determine which tuning will become the "True" Dominant Tuning Concern 106. This one "True" Dominant Tuning Concern 106 is now passed into the remainder of the autotuning algorithm, as detailed in FIG. 2, as the Dominant Tuning Concern 106 to be mitigated by operational changes.

Figure 11:
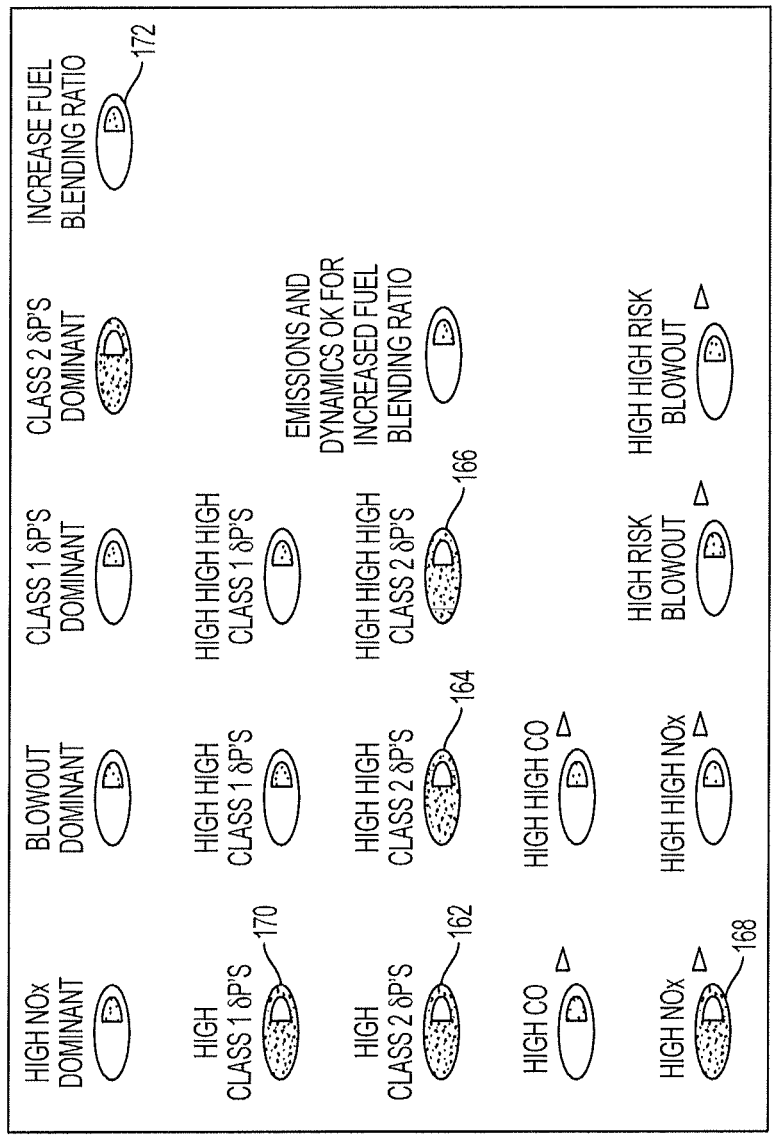
FIG. 11 shows a first example schematic of the determination of the system's dominant tuning concern, given various alarm inputs into the present disclosure.

FIGS. 11-15 provide exemplary graphical representations of the autotuning system interface depicting how the Boolean Logic Hierarchy works in practice. FIG. 11 shows the alarms returned in connection with the example set forth above with respect to FIG. 10. Namely, alarms are returned for Class 2 OP's at the levels of H 162, HH 164 and HHH 166. In addition, alarms for NOx 168 and Class 1 6P's 170 are returned at the H level. Since more extreme levels trump conflicts of different alarms at the same level, the HHH Class 2 6P's is the priority and therefore the dominant tuning concern 172.

Figure 12:
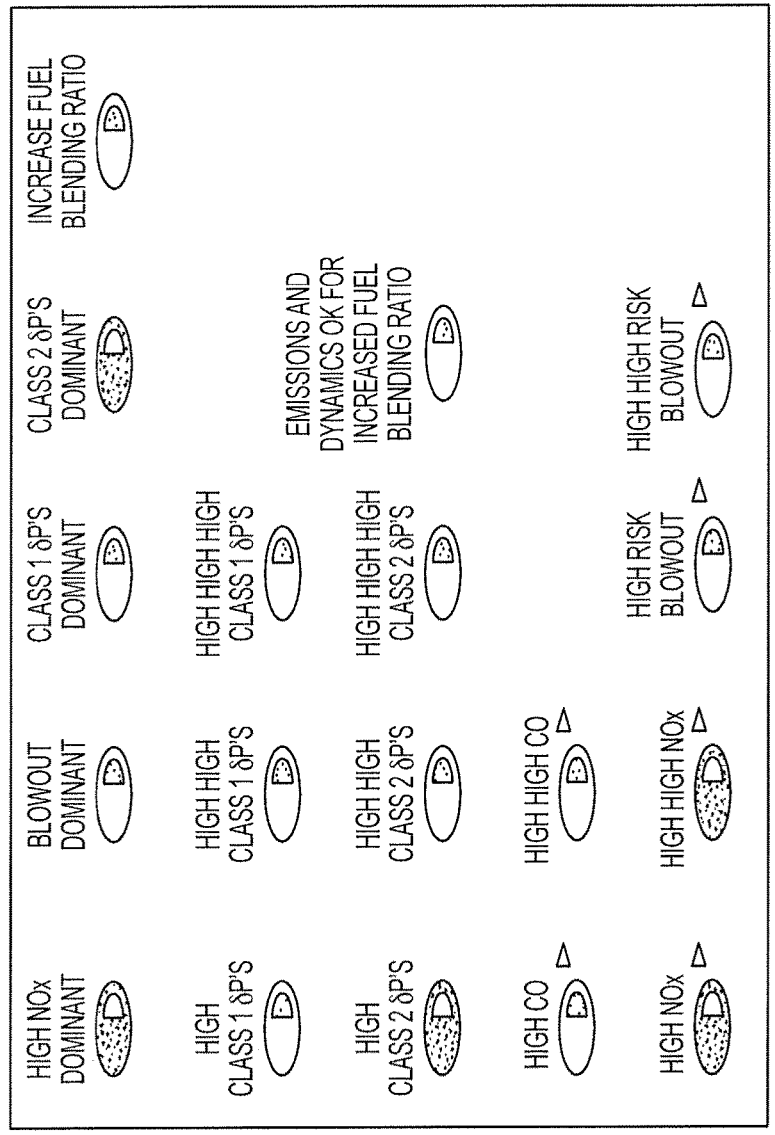
FIG. 12 shows a second example schematic of the determination of the system's dominant tuning concern, given various alarm inputs into the present disclosure.
Figure 13:
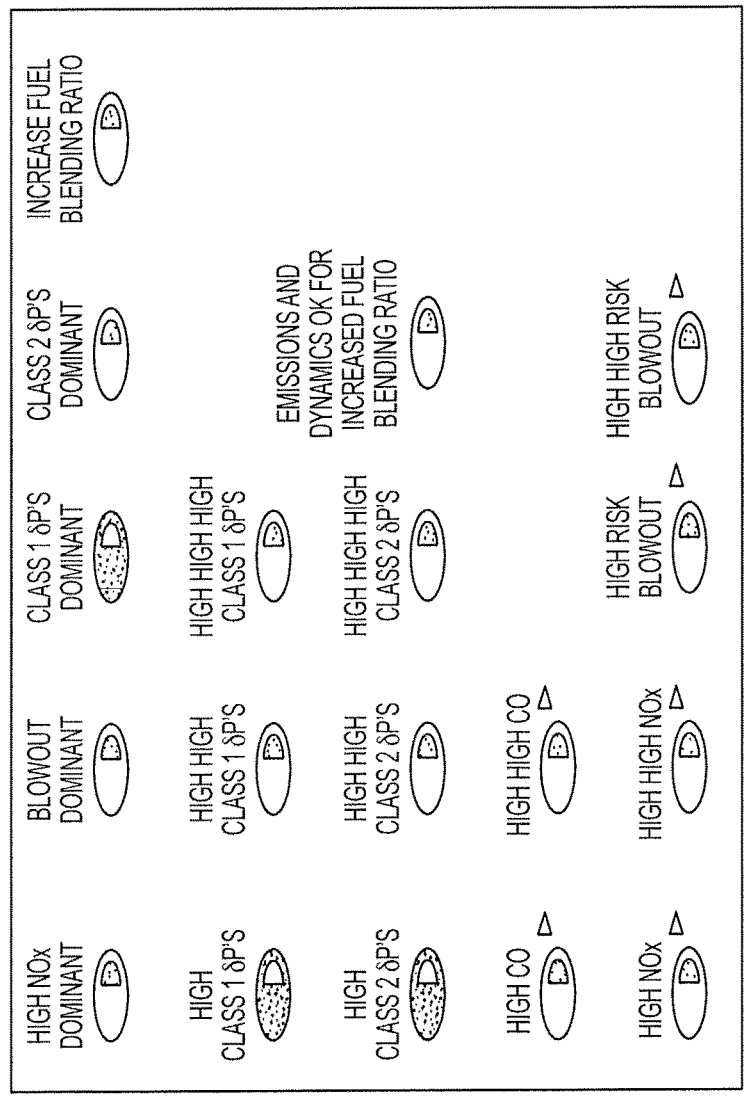
FIG. 13 shows a third example schematic of the determination of the system's dominant tuning concern, given various alarm inputs into the present disclosure.
Figure 14:
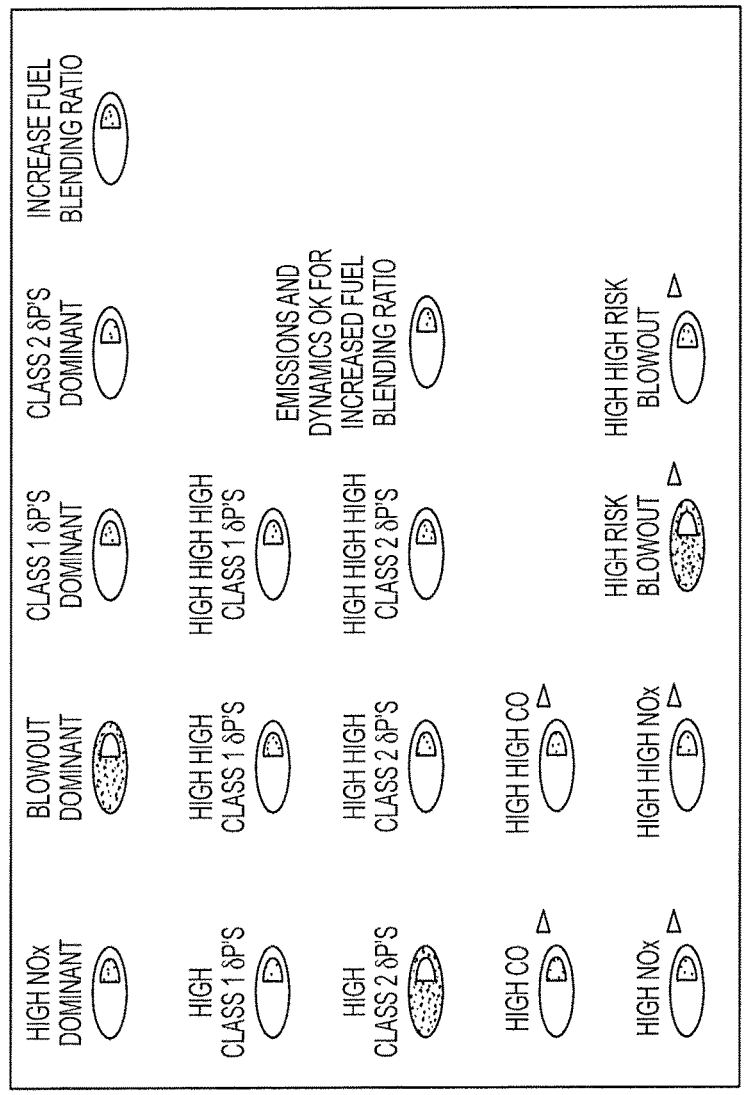
FIG. 14 shows a fourth example schematic of the determination of the system's dominant tuning concern, given various alarm inputs into the present disclosure.

FIGS. 12-14 show various further examples of the dominant tuning concern for different "True" alarm levels under the user defined hierarchy 144 of FIG. 10. FIG. 12 shows a NOx alarm at the HH level returned, with no other alarms of this severity. Thus, high NOx is the dominant tuning concern. FIG. 13 shows a Class 1 6P's at an H level as the only alarm condition, thus making Class 1 6P's as the dominant tuning concern. Finally, FIG. 14 shows that Class 2 6P's and Blowout both return alarms at the H level. Referring to the user ranking of dominant tuning issues 144 in FIG. 8, Blowout is ranked as a priority above Class 2 6P's and thus, although the severity of the alarms is equal, Blowout becomes the dominant tuning concern.

Figure 15:
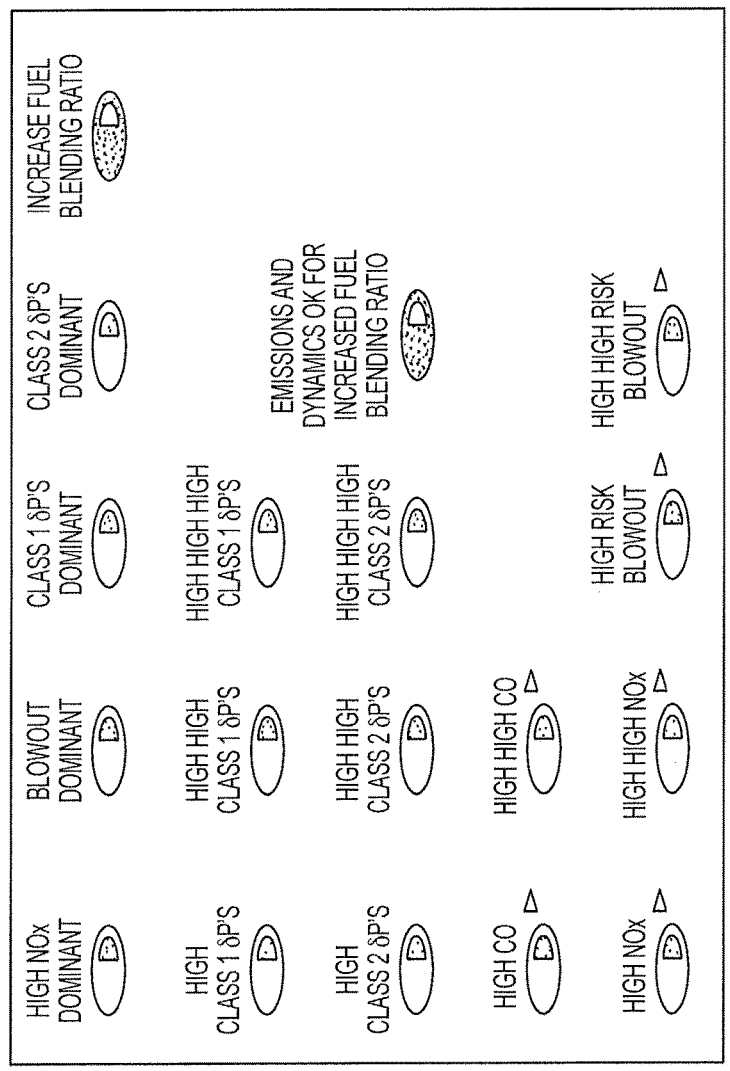
FIG. 15 shows a fourth example schematic of the determination of the system's dominant tuning concern, given various alarm inputs into the present disclosure.

FIG. 15 shows an operational example of when an increase of the fuel blend ratio may be called for. In this case, there are no tuning limit alarms, such as those shown in FIGS. 11-14. Thus, the system is operating within the operational envelope. Also, the system is operating within the operational limits where the amount of non-pipeline quality fuel may be increased, such as those shown in block 162 of FIG. 9. In such a case, the system will indicate that in increase in fuel blend ratio is called for.

Figure 16:
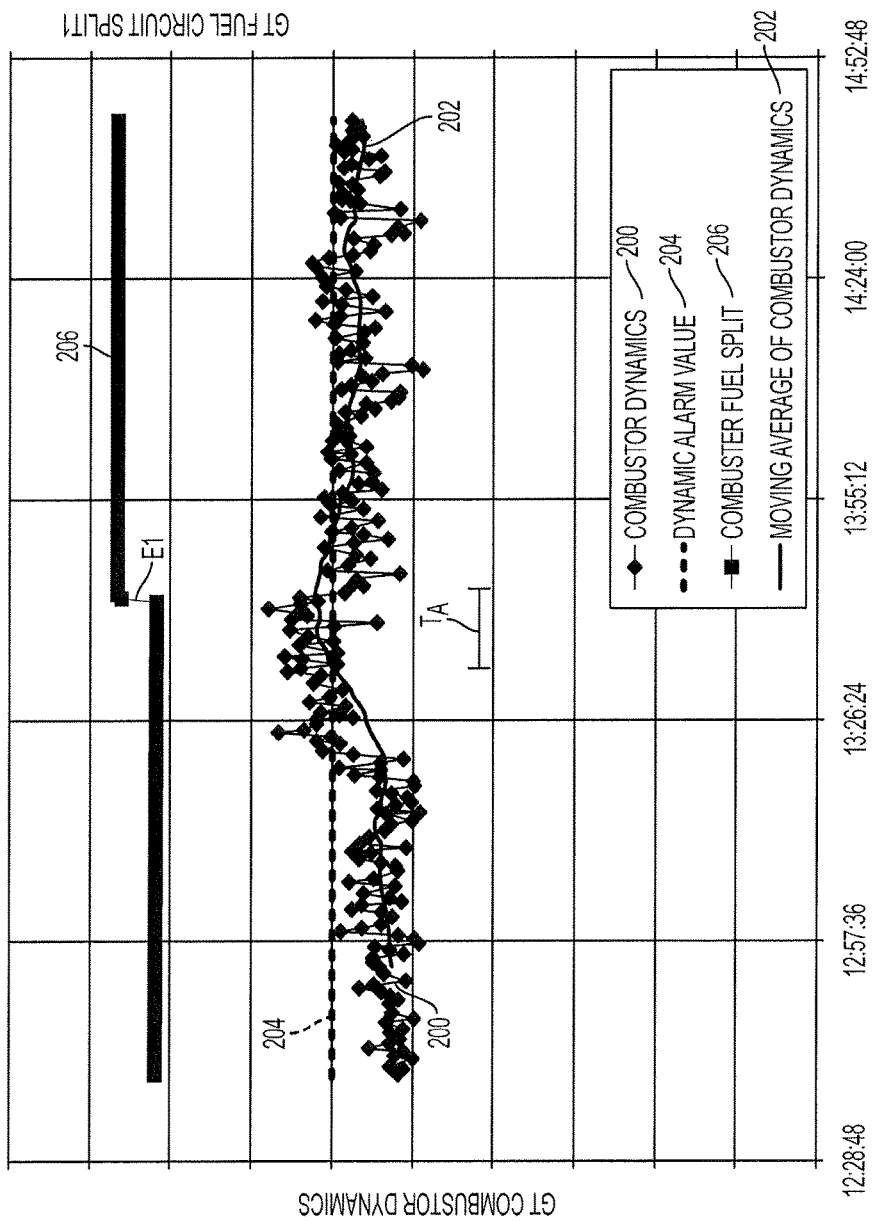
FIG. 16 shows a first operational example of operational tuning of a fuel turbine engine system as contemplated by the present disclosure.

In FIGS. 16-19, there is shown various examples of the operational results of a tuning operation of a tuning controller of the present disclosure based on operational data from a running turbine system. In FIG. 16, the dominant tuning concern is high Class 2 6P's, and a change in the combustor fuel split E1 is made in reaction to a high Class 2 6P's alarm generated when the combustor dynamics moves outside of the set operational priorities for optimum dynamics. The actual combustor dynamics data received by the turbine controller 10 from, for example, the CDMS 50 is designated as 200 in the graph. The moving average for the combustor dynamics is identified in the graph as 202. When the combustor dynamics exceed the dynamics alarm limit value 204 for a set period of time TA an alarm goes off within the tuning controller. This alarm causes the first event E1 and a resulting incremental adjustment in the combustor fuel split tuning parameter 206. As illustrated, the incremental increase in the fuel split causes a corresponding drop in the combustor dynamics 200, with the average combustor dynamics 202 dropping below the dynamics alarm limit 204. As time continues, the tuning is held by the tuning controller and the average combustor dynamics 202 maintains its operational position below the dynamics limit 204. Thus, no further adjustments necessary or alarms issued.

Figure 17:
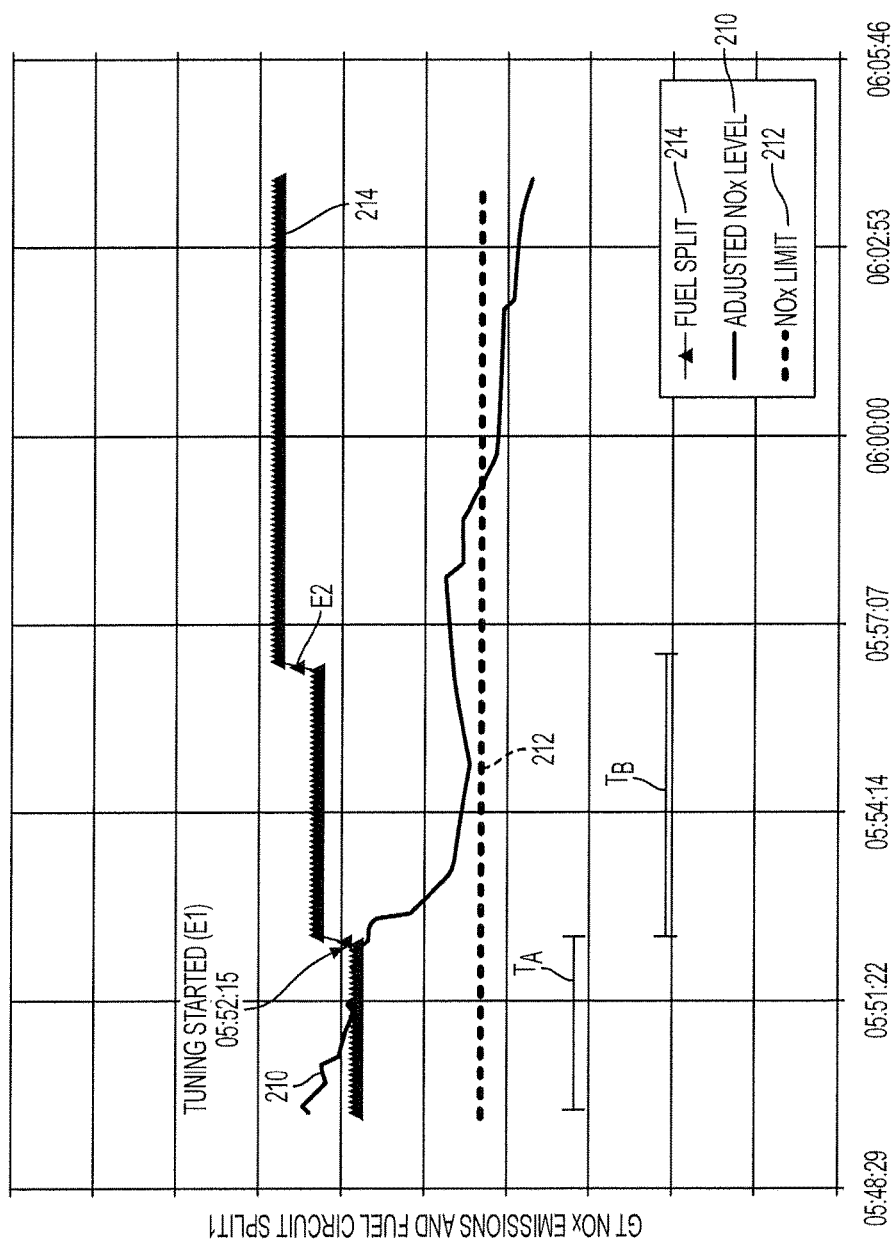
FIG. 17 shows a second operational example of operational tuning of a fuel turbine engine system as contemplated by the present disclosure.

In FIG. 17, the tuning criteria is NOx emissions. As NOx emissions data 210 is received from the tuning controller, an alarm is generated after the passage of time TA. The alarm is caused by the NOx emissions 210 exceeding the operational standard or tuning limit 212. The alarm activates a first event E1 resulting in an incremental increase in the fuel split 214. After a period of time TB from the first event E1, the NOx alarm is still activated due to the NOx emissions 210 exceeding the preset tuning limit 212. This continued alarm after time TB causes a second event E2 and a second incremental increase in the fuel split value 214. This second increase is equal in magnitude to the first incremental increase. The second event E2 causes the NOx emissions level 210 to drop below the preset limit 212 within the review time period and halts the alarm. As the NOx emissions 210 remains below the limit 212, the fuel split 214 tuning is held and the operation of the turbine continues with the defined operational parameters.

Figure 18:
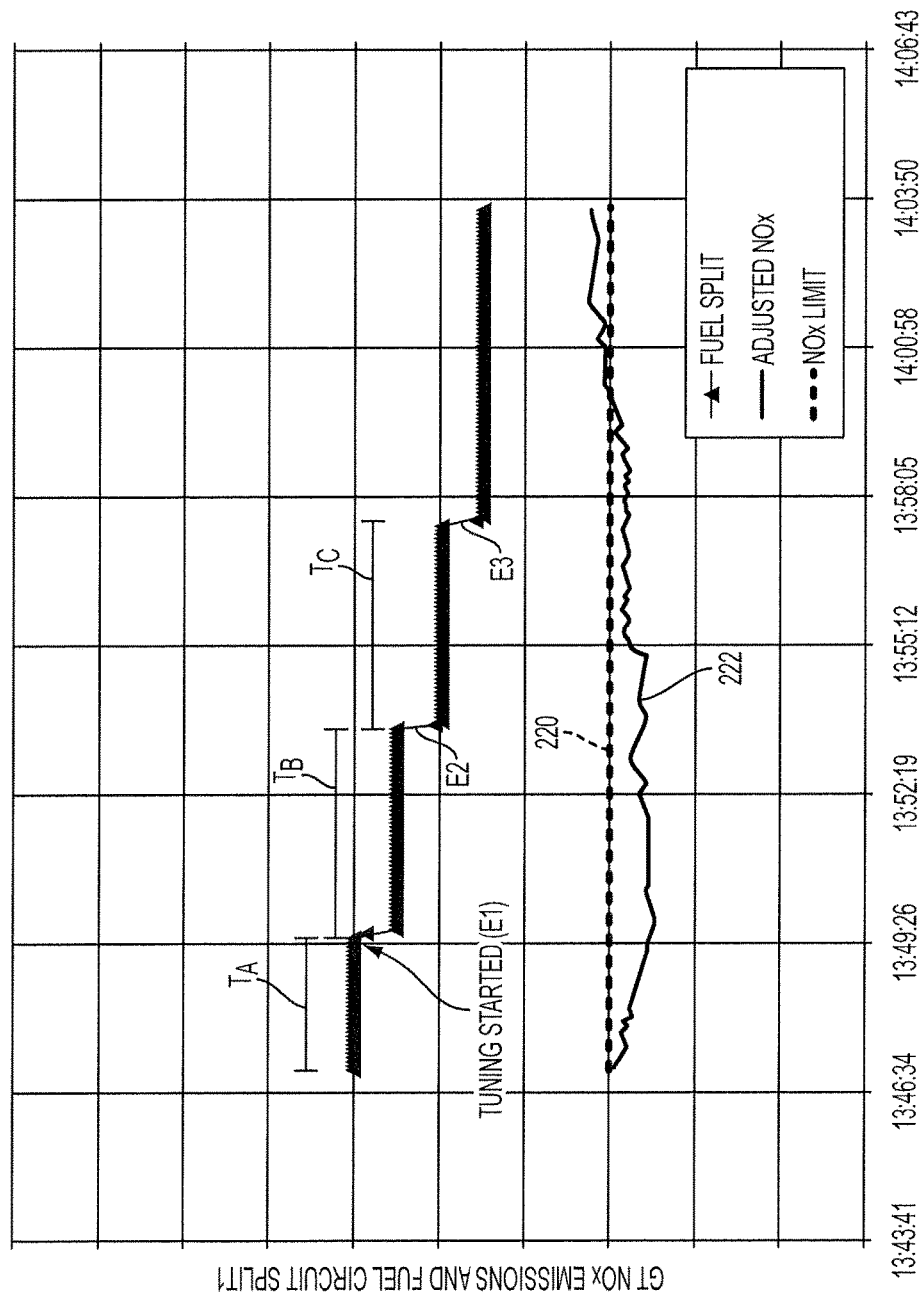
FIG. 18 shows a third operational example of operational tuning of a fuel turbine engine system as contemplated by the present disclosure.

In FIG. 18, the tuning criteria is again NOx emissions, with the alarm created by a low reading received by tuning controller. As shown, the NOx tuning limit 220 is defined. Upon passage of the set time period TA from receiving NOx level data 222, the alarm is generated and a first event E1 occurs. At the first event E1, the fuel split level 224 is incrementally adjusted downward. After a set passage of time TB from event E1 additional NOx emissions data 222 is received and compared to the preset alarm level 220. Because the NOx is still below the alarm level 220, a second event E2 occurs resulting in a further incremental reduction in the fuel split value 224. A further passage of time TC from event E2 occurs and additional data is received. Again, the NOx data 212 is low, maintaining the alarm and resulting in a further event E3. At event E3, the fuel split value 224 is again reduced by the same incremental amount. This third incremental adjustment results in the NOx emissions 222 rising above the preset limit 220 and results in removal of the alarm. The fuel split 224 tuning value set after event E3 is held in place by the tuning controller 10.

Figure 19:
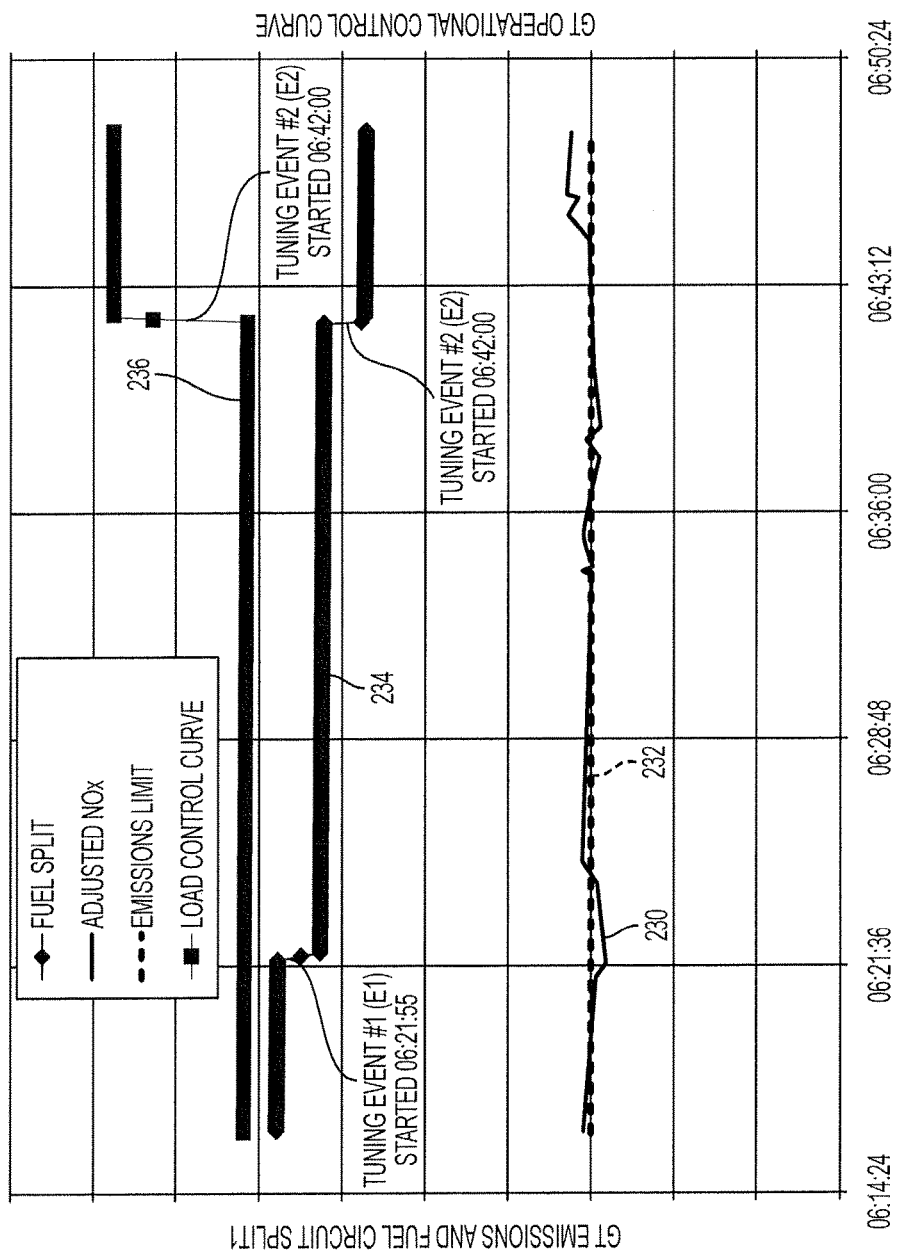
FIG. 19 shows a fourth operational example of operational tuning of a fuel turbine engine system as contemplated by the present disclosure.

In FIG. 19, the NOx emissions data 230 received by the tuning controller 10 is again tracking along the lower emissions limit 232. At the first tuning event E1, the fuel split value 234 is incrementally dropped to result in a corresponding increase in the NOx emissions 230 over the lower limit 232. After this first incremental adjustment, the NOx emissions for a period of time holds above the limit 232 and then begins to again fall. At the second tuning event E2, the fuel split value 234 is again adjusted by the designated fixed incremental value. This second adjustment then places the fuel split value 234 at its defined minimum within the preset range of allowable values (determined as a hard coded limit within the tuning controller 10). Because this limit is reached, the tuning operation moves to the next operational parameter, which is normally the second fuel circuit adjustment. In the example provided, this second circuit value (not shown) is already at its set maximum/minimum and is therefore not adjusted. Thus, the tuning operation moves on to the next operational parameter, load control curves 236. As shown, at event E2 an incremental adjustment is made in the load control curve value 236. The increase in the load control curve value 236 results in a corresponding increase in the NOx emission 230 to a value above the minimum 232 and removes the alarm. Upon removal of the alarm, the tuning settings are held and no further adjustments are made. The tuning controller 10 then proceeds to receive data from the sensor means, through the DCS, and continues to make comparisons with the set operational standards (including the minimum NOx emissions limit EL).

Figure 20:
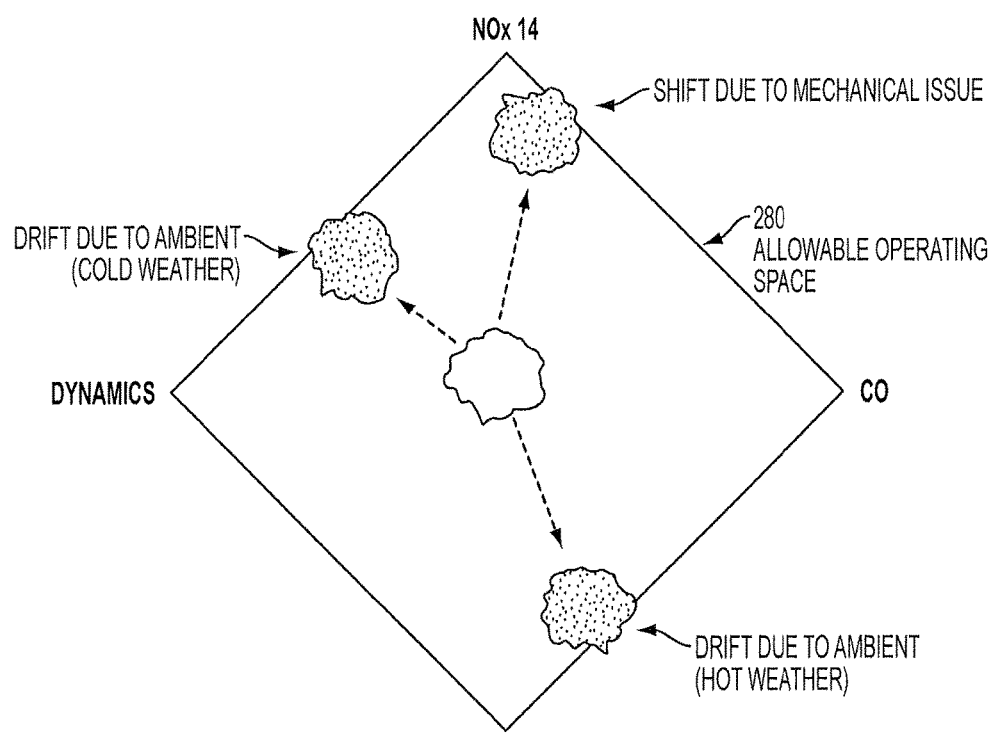
FIG. 20 shows a first exemplary schematic representation of the function of the tuning controller of the present disclosure in maintaining the tuning of the turbine system.
Figure 21:
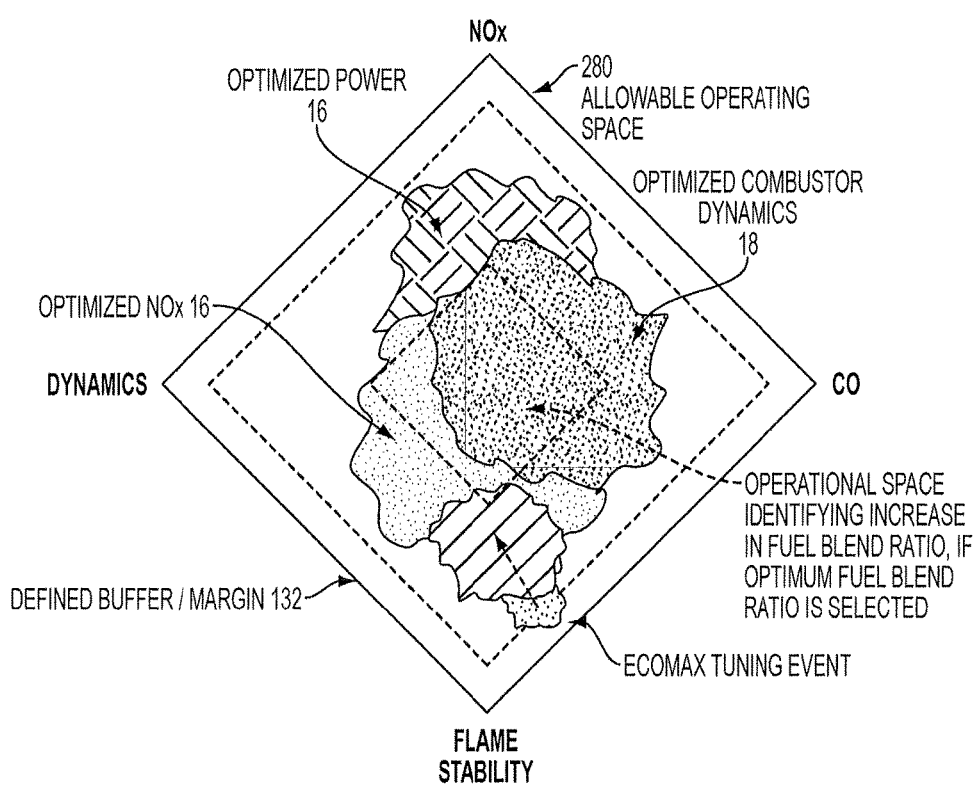
FIG. 21 shows a second exemplary schematic representation of the function of the tuning controller of the present disclosure in maintaining the tuning of the turbine system.

FIGS. 20 and 21 are typical schematic representations of the operation of the tuning controller within contemplated disclosure. The operation of the turbine is defined by the emission output of the turbine, both NOx and CO, turbine dynamics and flame stability. In FIG. 19, a tuned system is defined by a preferred operating envelope in the center of the operational diamond. This preferred operational envelope is typically manually set based on a prior start-up or operation of the turbine system. However, weather changes, both hot and cold, and mechanical changes within the turbine system cause a drift within the operational diamond. Hence a tuning is desired so as to maintain the turbine operation within the preferred range, FIG. 20 also provides an example image of the allowable operating space, 280 where an increase in the amount of the non-pipeline quality fuel is permissible. As described above, this operating space is within the range defined by the allowable tuning limits.

In FIG. 21, a defined buffer/margin 132 is set within the operational diamond to serve as a warning for a drift of the turbine operation outside of the preferred operational envelope. Once one of the sensed operational values reaches the defined buffer line or limit, an alarm is generated, causing a tuning event. Based on the direction of the drift, the tuning controller creates a preset reaction to meet the specifics of the tuning need. This preset reaction is a defined incremental shift in an operational parameter of the turbine as a means for moving the turbine operational envelope back into the desired range, and away from the buffer limit. Also shown on FIGS. 20 and 21 are representations of the operating spaces employed by selecting the Optimum NOx 14, Optimum Power 16, and Optimum Combustor Dynamics 18 Toggle Switches of the User Interface Display 12 of FIG. 5 within the overall turbine combustor operating envelope. It should be noted that FIG. 20 does not show a pictorial representation of the Optimum Fuel Blend Ratio 19 optimization mode. This operational mode overlays "on top" of the entire combustion operating envelope with no clear bias toward any edge of operation, and as such is not shown. It should be noted that each parameter may have more than one alarm, such as high "H"; high-high "HH" and high-high-high "HHH." These alarms may be sequentially located around the diamond shown to alert operators of how close the turbine operation is to the outside of desired operational limits.

The present disclosure has been described and illustrated with respect to a number of exemplary embodiments thereof. It should be understood by those skilled in the art from the foregoing that various other changes, omissions and additions may be made therein, without departing from the spirit and scope of the present disclosure, with the scope of the present disclosure being described by the foregoing claims.

The invention claimed is:

1. A method for automated control of a combustion turbine fuel composition through automated modification of a ratio of fuel gas, comprising:
providing a first fuel source;
providing a second fuel source;
supplying fuel to a combustion turbine in a blend of fuel from the first source and second source;
specifying one or more first tuning priorities, wherein the first tuning priorities comprise one or more selected from the group comprising NOx levels, power level and combustion dynamics, wherein specifying the NOx levels or combustion dynamics tuning priority comprises adjusting the tuning priority within a range and specifying the power level tuning priority comprises switching on or switching off the tuning priority, and wherein the specifying of the one or more first tuning priorities operates to change a first set of stored operational standards;
specifying one or more second tuning priorities, wherein the specifying of the one or more second tuning priorities operates to overlay a second set of stored operational standards upon the first set of stored operational standards, wherein the specifying of the one or more second tuning priorities comprises switching on or switching off the second tuning priority;
sensing in real-time or near real operational parameters of the gas turbine;
determining whether the operational parameters are within the first or second set of stored operational standards;
adjusting the blend of the first fuel source and the second fuel source, based on whether the operational parameters are within the second set of stored operational standards.

2. The method of claim 1, further comprising:
providing a hierarchy of the one or more first and one or more second tuning priorities; and
setting the first and second set of stored operational standards based on the hierarchy of the tuning priorities.

3. The method according to claim 2, wherein providing a hierarchy of the one or more first and one or more second tuning priorities comprises ranking the tuning priorities according to an end user's preferences.

4. The method of claim 1, further comprising:
making incremental adjustments of at least one operational parameter of the turbine.

5. The method of claim 4, wherein making incremental adjustments of at least one operational parameter of the turbine comprises making incremental adjustments in one or more operational parameters of the turbine,
wherein the one or more operational parameters comprise one or more selected from the group comprising combustor fuel distribution split within the nozzles of the combustor, fuel gas inlet temperature, and fuel/air ratio within the turbine.

6. The method according to claim 1, wherein the step of adjusting the ratio of the first fuel sources to the second fuel source comprises making incremental adjustments of at least one operational parameter of the turbine.

7. The method according to claim 1, further comprising producing one or more indicators if the operational parameters are not within the operational standards, wherein the one or more indicators are ranked based on the severity of the indicator.

8. The method according to claim 7, wherein the one or more indicators are further ranked based on the one or more first and one or more second tuning priorities, such that indicators of the same magnitude are ranked based on the one or more first and one or more second tuning priorities.

9. The method according to claim 1, wherein adjusting the blend of the first fuel source to the second fuel source comprises making incremental adjustments of the ratio of the first fuel source to second fuel source in one or more operational parameters of the turbine.

10. The method according to claim 1, wherein the one or more second tuning priorities comprise fuel blend ratio.

11. The method according to claim 1, wherein the first fuel source is pipeline quality fuel.

12. The method according to claim 1, wherein the second fuel source is non-pipeline quality fuel.

13. The method according to claim 1, wherein the blend comprises 0-100% of the first fuel source.

14. The method according to claim 1, wherein the blend comprises 0-100% of the second fuel source.

15. The method according to claim 1, wherein the blend is the inverse ratio of the first fuel source.

16. The method according to claim 1, wherein the blend is the inverse ratio of the second fuel source.

17. The method according to claim 1, wherein fuel blend adjustments are done incrementally.

18. A tuning system for automated control of a gas turbine fuel composition through automated modification of a ratio of fuel gas, comprising:
   operational turbine controls for controlling operational control elements of the turbine,
   a tuning controller communicating with the controls, the controller configured to tune the operation of the turbine in accordance with the following:
      specifying one or more first tuning priorities, wherein the first tuning priorities comprise one or more selected from the group comprising NOx levels, power level and combustion dynamics, wherein specifying the NOx levels or combustion dynamics tuning priority comprises adjusting the tuning priority within a range and specifying the power level tuning priority comprises switching on or switching off the tuning priority, and wherein the specifying of the one or more first tuning priories operates to change a first set of stored operational standards;
      specifying one or more second tuning priorities, wherein the specifying of the one or more second tuning priorities operates to overlay a second set of stored operational standards upon the first set of stored operational standards, wherein the specifying of the one or more second tuning priorities comprises switching on or switching off the second tuning priority;
      receiving real-time or near real-time operational data about the turbine,
      determining whether the operational data is within the first or second set of stored operational standards; and
      providing a blend of fuel to a level blend ratio controller, the blend having fuel from at least one of a first and second fuel source ratio controller, the fuel blend ratio controller adjusting the ratio of the first fuel source and the second fuel source based on whether the operational data are within the second set of stored operational standards.

19. The tuning system according to claim 18, wherein tuning the operation of the turbine comprises making incremental adjustments of at least one operational control element of the turbine.

20. The tuning system according to claim 18, further comprising at least one sensor for sensing at least one of combustor dynamics or turbine exhaust emissions.

21. The tuning system according to claim 18, wherein the one or more indicators are ranked based on the severity of each indicator.

22. The tuning system according to claim 21, wherein the one or more indicators are further ranked based on the tuning priorities, such that indicators of the same magnitude are ranked based on the tuning priorities.

23. The tuning system according to claim 18, wherein providing the blend of the first fuel source to the second fuel source comprises making incremental adjustments of the ratio of the first fuel source to second fuel source in one or more operational parameters of the turbine.

24. The tuning system according to claim 18, wherein tuning the operation of the turbine based on dominant tuning concern comprises making incremental adjustments in one or more operational control elements of the turbine, wherein the one or more operational control elements comprise one or more from the group comprising combustor fuel distribution split within the nozzles of the combustor, fuel gas inlet temperature, and fuel/air ratio within the turbine.

25. The tuning system according to claim 18, wherein the one or more indicators comprises one or more alarm levels indicating that the operational data of the turbine is outside of allowable limits of the turbine.

26. The tuning system according to claim 18, wherein the one or more second tuning priorities for the turbine comprise fuel blend ratio.

27. The tuning system according to claim 18, wherein the tuning controller communicates with the operational turbine controls through a distribution control system (DCS).

28. The tuning system according to claim 18, wherein the tuning controller communicated directly with the turbine controller.

29. The tuning system according to claim 18, wherein the first fuel source is pipeline quality fuel.

30. The tuning system according to claim 18, wherein the second fuel source is non-pipeline quality fuel.

31. The tuning system according to claim 18, wherein the blend comprises 0-100% of the first fuel source.

32. The tuning system according to claim 18, wherein the blend comprises 0-100% of the second fuel source.

33. The tuning system according to claim 18, wherein the blend is the inverse ratio of the first fuel source.

34. The tuning system according to claim 18, wherein the blend is the inverse ratio of the second fuel source.

35. The tuning system according to claim 18, wherein fuel blend adjustments are done incrementally.

* * * * *